US011541779B2

(12) United States Patent
Tanaka et al.

(10) Patent No.: US 11,541,779 B2
(45) Date of Patent: Jan. 3, 2023

(54) HYBRID VEHICLE AND METHOD FOR CONTROLLING THE SAME

(71) Applicant: TOYOTA JIDOSHA KABUSHIKI KAISHA, Toyota (JP)

(72) Inventors: Nobuyuki Tanaka, Toyota (JP); Kazuki Kubo, Toyota (JP); Kimihito Nakamura, Toyota (JP); Kenta Fujimoto, Toyota (JP); Takayuki Oshino, Toyota (JP); Yoshihiro Uchida, Nagakute (JP); Koichi Tsuji, Gifu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 348 days.

(21) Appl. No.: 16/992,729

(22) Filed: Aug. 13, 2020

(65) Prior Publication Data

US 2021/0070193 A1   Mar. 11, 2021

(30) Foreign Application Priority Data

Sep. 10, 2019  (JP) .............................. JP2019-164358
Dec. 23, 2019  (JP) .............................. JP2019-231890

(51) Int. Cl.
*B60L 58/26* (2019.01)
*B60L 58/12* (2019.01)
*B60L 3/00* (2019.01)

(52) U.S. Cl.
CPC ............ *B60L 58/26* (2019.02); *B60L 3/0023* (2013.01); *B60L 58/12* (2019.02); *B60L 2240/12* (2013.01); *B60L 2240/545* (2013.01)

(58) Field of Classification Search
None
See application file for complete search history.

(56) References Cited

U.S. PATENT DOCUMENTS

| 2007/0233334 | A1* | 10/2007 | Kozarekar | ............ | B60W 20/13 701/22 |
| 2010/0087976 | A1* | 4/2010 | Aridome | ............... | B60W 20/10 180/65.265 |
| 2015/0274030 | A1* | 10/2015 | Payne | ................ | G01C 21/3461 903/903 |

FOREIGN PATENT DOCUMENTS

JP    2008-239079 A    10/2008

* cited by examiner

*Primary Examiner* — Todd Melton
*Assistant Examiner* — Jason R Roberson
(74) *Attorney, Agent, or Firm* — Sughrue Mion, PLLC

(57) ABSTRACT

A vehicle includes: an engine; an exhaust pipe through which exhaust gas from the engine is released; a battery pack located near the exhaust pipe; and an ECU that executes, during limp-home traveling of the vehicle, control in which the battery pack is not charged and discharged, and output suppression control in which output of the engine is suppressed. In the output suppression control, when the catalyst temperature is above a threshold value, the ECU suppresses the output of the engine, as compared to when the catalyst temperature is below the threshold value, while maintaining a state in which the engine can output power.

17 Claims, 14 Drawing Sheets

HYBRID VEHICLE AND METHOD FOR CONTROLLING THE SAME

This nonprovisional application is based on Japanese Patent Applications No. 2019-164358 filed on Sep. 10, 2019 and No. 2019-231890 filed on Dec. 23, 2019, with the Japan Patent Office, the entire contents of which are hereby incorporated by reference.

BACKGROUND

Field

The present disclosure relates to a hybrid vehicle and a method for controlling the same, and more particularly to a technique for controlling an engine mounted on a hybrid vehicle.

Background

In recent years, hybrid vehicles have become popular. Hybrid vehicles are provided with battery packs for traveling, and there have been proposed techniques for protecting battery packs. For example, in a hybrid vehicle disclosed in Japanese Patent Laying-Open No. 2008-239079, when a malfunction of a battery pack is detected, the battery pack is electrically disconnected from an electric load including a motor generator, so that the vehicle is driven by an engine. In this hybrid vehicle, when a further malfunction of the battery pack is detected during such limp-home traveling, the engine-based traveling is prohibited.

SUMMARY

A hybrid vehicle, if mounted with a comparatively large battery pack, needs a space for the battery pack accordingly. In such a case, the battery pack may be placed outside the passenger compartment, instead of being placed inside the passenger compartment.

If the battery pack is placed outside the passenger compartment, particularly near the exhaust pathway from the engine, the heat from the exhaust pathway may be radiated to the battery pack to cause its temperature rise. If the battery pack temperature excessively rises, the hybrid vehicle may have to stop traveling from the viewpoint of protecting the battery pack. To avoid this, it is preferred that the battery pack be appropriately protected while the hybrid vehicle can continue traveling.

(1) A hybrid vehicle according to one aspect of the present disclosure includes: an engine; an exhaust pathway through which exhaust gas from the engine is released; a battery pack located near the exhaust pathway; and a controller. The controller executes, during limp-home traveling of the hybrid vehicle, control in which the battery pack is not charged and discharged, and output suppression control in which output of the engine is suppressed. In the output suppression control, when an estimated temperature of the battery pack is above a threshold value, the controller suppresses the output of the engine as compared to when the estimated temperature is below the threshold value, while maintaining a state in which the engine can output power.

(2) The hybrid vehicle further includes: a drive device that drives a traction motor of the hybrid vehicle; and a relay electrically connected between the battery pack and the drive device. During the limp-home traveling, the controller opens the relay so that the battery pack is electrically disconnected from the drive device.

(3) The exhaust pathway includes a catalyst for purifying the exhaust gas. The hybrid vehicle further includes a sensor that outputs a temperature of the catalyst. The controller uses the temperature of the catalyst as the estimated temperature.

(4) The exhaust pathway includes a catalyst for purifying the exhaust gas. The hybrid vehicle further includes a sensor that outputs an operational status of the engine. The controller estimates a temperature of the catalyst based on the output from the sensor, and uses the temperature of the catalyst as the estimated temperature.

(5) The battery pack includes an assembled battery, a cooling device that cools the assembled battery, and equipment that is not cooled by the cooling device. The hybrid vehicle further includes a sensor that outputs a temperature of the assembled battery as the estimated temperature.

In the configuration of the above (1) to (5), in the output suppression control, when an estimated temperature (the temperature of a catalyst or the temperature of an assembled battery) is above a threshold value, the controller suppresses the engine output, as compared to when the estimated temperature is below the threshold value, while maintaining a state in which the engine can output power. In particular, while the battery pack is electrically disconnected from the drive device, the hybrid vehicle relies only on the engine output for traveling. This results in a larger amount of radiant heat from the exhaust pipe and thus is likely to cause a greater temperature rise of the battery pack. Suppressing the engine output causes a decrease in further temperature rise of the exhaust pathway, thereby preventing an excessive temperature rise of the battery pack (or the equipment in the battery pack) that would be caused by the radiant heat from the exhaust pathway. Therefore, according to the configuration of the above (1) to (5), the battery pack can be protected while the hybrid vehicle can continue traveling.

(6) The controller executes the output suppression control when a state in which the estimated temperature is above the threshold value lasts longer than a first predetermined time.

If a rise in estimated temperature is only temporary, an excessive temperature rise of the battery pack will not occur. Accordingly, in the configuration of the above (6), the output suppression control is executed only if the estimated temperature continues to be above a threshold value. This can avoid excessive suppression of the engine output that does not contribute to the prevention of temperature rise of the battery pack.

(7) When a speed of the hybrid vehicle is more than a first predetermined speed, the controller delays a start of execution of the output suppression control as compared to when the speed of the hybrid vehicle is less than the first predetermined speed.

A higher vehicle speed causes a stronger traveling wind blowing against the battery pack. Since a vehicle speed more than the first predetermined speed allows a traveling wind to cool the battery pack sufficiently, the starting timing of the execution of the output suppression control is preferably determined by taking the cooling effect into consideration. According to the configuration of the above (7), when the vehicle speed is more than the first predetermined speed, the controller delays the start of execution of the output suppression control as compared to when the vehicle speed is less than the first predetermined speed. This can prevent the output suppression control from being executed when the battery pack has already been cooled.

(8) When the estimated temperature goes below another threshold value less than the threshold value after the suppression of the engine output, the controller stops the output suppression control.

When the estimated temperature goes below the another threshold value, that is, when the estimated temperature has decreased, the output suppression control is stopped (canceled) because the battery pack can be prevented from an excessive temperature rise. Thus, according to the configuration of the above (8), the hybrid vehicle can recover its traveling performance.

(9) When a state in which the estimated temperature is below the another threshold value lasts longer than a second predetermined time after the suppression of the engine output, the controller stops the output suppression control.

If the output suppression control is stopped though the decrease in estimated temperature is only temporary, an excessive temperature rise of the battery pack may not be prevented. Accordingly, in the configuration of the above (8), the output suppression control is stopped only if the estimated temperature continues to be below the another threshold value. This can more reliably prevent an excessive temperature rise of the battery pack.

(10) When a speed of the hybrid vehicle is more than a second predetermined speed, the controller accelerates a stop of the output suppression control as compared to when the speed of the hybrid vehicle is less than the second predetermined speed.

According to the configuration of the above (10), when the vehicle speed is more than the second predetermined speed, the controller accelerates a stop of the output suppression control as compared to when the vehicle speed is less than the second predetermined speed. This can prevent the output suppression control from being continued when the battery pack has already been cooled.

(11) The controller increases a degree of suppression of the output of the engine with an increase in the estimated temperature.

A higher estimated temperature causes a larger amount of radiant heat from the exhaust pathway and thus is likely to cause a greater temperature rise of the battery pack. Thus, in the configuration of the above (11), the degree of suppression of the engine output is increased with an increase in the estimated temperature. This can more reliably prevent an excessive temperature rise of the battery pack.

(12) The controller decreases the degree of suppression of the output of the engine with an increase in vehicle speed of the hybrid vehicle.

The hybrid vehicle traveling at a higher vehicle speed causes a stronger traveling wind blowing against the battery pack, thereby causing a larger amount of heat radiation from the battery pack. This makes the battery pack temperature less likely to rise even with the radiant heat from the exhaust pipe. As a result, there is less need to suppress the engine output. Accordingly, in the configuration of the above (12), the degree of suppression of the engine output is decreased with an increase in vehicle speed. This can prevent the hybrid vehicle from experiencing an excessive decrease in the traveling performance.

(13) The hybrid vehicle further includes a notifying device that notifies a user of the hybrid vehicle that the output suppression control is being executed.

According to the configuration of the above (13), the user receiving the notification can recognize that the output suppression control is being executed. This can reduce the user's sense of discomfort that would be caused by the decrease in traveling performance of the hybrid vehicle.

(14) In the output suppression control, when the estimated temperature is above the threshold value, the controller reduces an upper limit output of the engine as compared to when the estimated temperature is below the threshold value.

(15) In the output suppression control, when the estimated temperature is above the threshold value, the controller reduces a request output for a given accelerator position as compared to when the estimated temperature is below the threshold value.

According to the configuration of the above (14) and (15), the output suppression control can be implemented by decreasing the upper limit output or request output of the engine. Thus, an excessive temperature rise of the battery pack can be prevented.

(16) A hybrid vehicle according to another aspect of the present disclosure includes: an engine; an exhaust pathway which includes a catalyst for purifying exhaust gas from the engine and through which the purified exhaust gas is released; a battery pack located near the exhaust pathway; and a controller. The controller executes, during limp-home traveling of the hybrid vehicle, control in which the battery pack is not charged and discharged, and output suppression control in which output of the engine is suppressed. In the output suppression control, when a state in which a temperature of the catalyst is above a threshold value lasts longer than a predetermined time, the controller suppresses the output of the engine as compared to when the temperature of the catalyst is below the threshold value, while maintaining a state in which the engine can output power.

According to the configuration of the above (16), the battery pack can be protected while the hybrid vehicle can continue traveling, as with the configuration of the above (1).

(17) In a control method for a hybrid vehicle according to still another aspect of the present disclosure, the hybrid vehicle includes: an engine; an exhaust pathway through which exhaust gas from the engine is released; and a battery pack located near the exhaust pathway. The control method includes first and second steps. The first step is detecting an estimated temperature of the battery pack. The second step is, during limp-home traveling of the hybrid vehicle, controlling the battery pack not to be charged and discharged, and when the estimated temperature is above a threshold value, suppressing output of the engine as compared to when the estimated temperature is below the threshold value, while maintaining a state in which the engine can output power.

According to the method of the above (17), the battery pack can be protected while the hybrid vehicle can continue traveling, as with the configuration of the above (1).

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
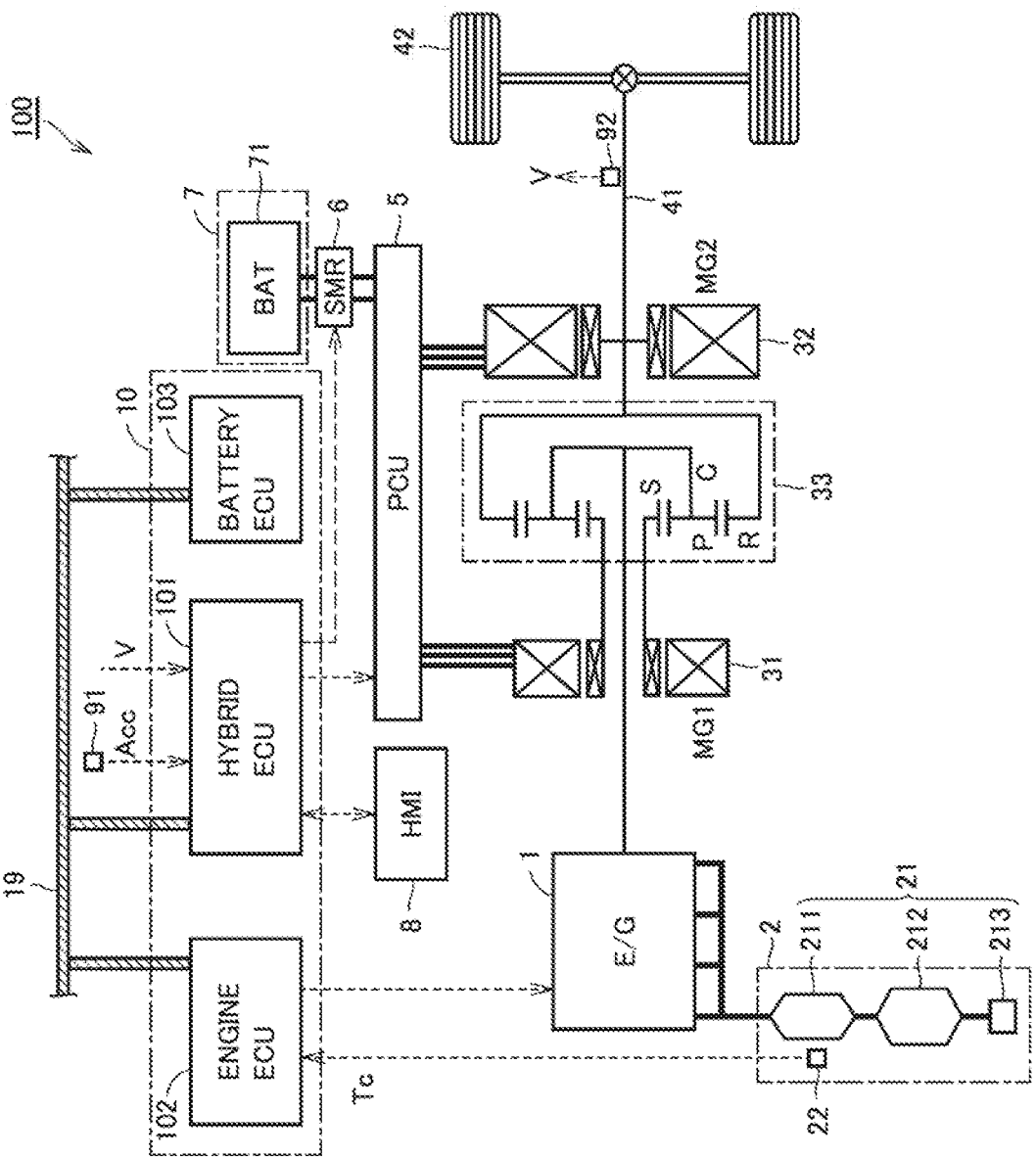
FIG. 1 is a block diagram schematically showing a general configuration of a vehicle in embodiment 1.

The present embodiments will now be described in detail with reference to the drawings. In the drawings, the same or corresponding parts are designated by the same reference signs, and the description of such parts is not repeated.

Embodiment 1

<Configuration of Hybrid Vehicle>

FIG. 1 is a block diagram schematically showing a general configuration of a hybrid vehicle in embodiment 1. With reference to FIG. 1, in this embodiment, a vehicle 100 is a hybrid vehicle (HV). However, vehicle 100 may be a plug-in hybrid vehicle (PHV) which can be charged with electric power from outside of the vehicle.

Vehicle 100 includes an engine 1, an exhaust system 2, a first motor generator (MG) 31, a second MG 32, a motive power dividing device 33, an output shaft 41, a drive wheel 42, a power control unit (PCU) 5, a system main relay (SMR) 6, a battery pack 7, a human machine interface (HMI) 8, an accelerator position sensor 91, a vehicle speed sensor 92, and an electric control unit (ECU) 10. ECU 10 includes a hybrid ECU 101, an engine ECU 102, and a battery ECU 103.

Engine 1 burns fuel based on the control signal from engine ECU 102 to output motive power. Engine 1 is, for example, a gasoline engine or a diesel engine. Upon cranking of first MG 31, engine 1 starts and supplies motive power to at least one of first MG 31 and output shaft 41 through motive power dividing device 33.

Exhaust system 2 allows the exhaust gas from engine 1 to be released from the vehicle. Exhaust system 2 includes an exhaust pipe 21 and a catalyst temperature sensor 22. Exhaust pipe 21 has a catalytic device 211, a filter 212, and a muffler 213 along the flow path of exhaust gas.

Catalytic device 211 oxidizes and reduces, respectively, an unburnt component (e.g., hydrocarbon (HC) or carbon monoxide (CO)) and an oxidation component (e.g., nitrogen oxides (NOx)) contained in the exhaust gas from engine 1. Filter 212 collects particulate matter (PM) from engine 1. Filter 212 is a gasoline particulate filter (GPF) if engine 1 is a gasoline engine, or is a diesel particulate filter (DPF) if engine 1 is a diesel engine. Muffler 213 reduces noise (exhaust noise) produced when the exhaust gas is released from the vehicle. Exhaust pipe 21 corresponds to the "exhaust pathway" in the present disclosure.

Catalyst temperature sensor 22 detects the bed temperature of catalyst included in catalytic device 211 (hereinafter also referred to as "catalyst temperature Tc"), and outputs the result of detection to engine ECU 102.

Each of first MG 31 and second MG 32 is an AC electric motor, e.g., a three-phase AC permanent magnet synchronous motor. First MG 31 can generate electric power using the motive power of engine 1 received through motive power dividing device 33. For example, when the state of charge (SOC) of battery pack 7 reaches a predetermined lower limit, engine 1 starts and first MG 31 generates electric power. The electric power generated by first MG 31 is subjected to voltage conversion by PCU 5, so that the power is stored in battery pack 7 or directly suppled to second MG 32.

Second MG 32 produces a driving force using at least one of the electric power stored in battery pack 7 and the electric power generated by first MG 31. The driving force from second MG 32 is transmitted to drive wheel 42 through output shaft 41. At the time of braking of vehicle 100, second MG 32 is driven by drive wheel 42 and thus operates as a regenerative brake that converts the braking energy to electric power. The electric power generated by second MG 32 is stored in battery pack 7.

Motive power dividing device 33 is configured to divide the driving force from engine 1 into motive power for driving drive wheel 42 and motive power for driving first MG 31. Motive power dividing device 33 is, for example, a planetary gear mechanism including a sun gear S, a planetary gear P, a ring gear R, and a carrier C.

PCU 5 converts high-voltage DC power supplied from battery pack 7 into AC power and outputs it to first MG 31 and/or second MG 32, based on the control signal from hybrid ECU 101. Thus, first MG 31 and/or second MG 32 is driven. Also, PCU 5 converts the AC power generated by first MG 31 and/or second MG 32 into DC power and outputs it to battery pack 7. Thus, battery pack 7 is charged. PCU 5 can also drive second MG 32 using the electric power generated by first MG 31.

SMR 6 is electrically connected between PCU 5 and battery pack 7. SMR 6 electrically connects and disconnects battery pack 7 to and from PCU 5, based on the control signal from hybrid ECU 101.

Battery pack 7 stores high-voltage DC power for driving first MG 31 and/or second MG 32. Battery pack 7 includes an assembled battery 71. Each cell constituting the assembled battery is a secondary battery, such as a nickel-metal hydride secondary battery or lithium-ion secondary battery.

HMI 8 transmits and receives signals to and from hybrid ECU 101. HMI 8 provides various types of information about vehicle 100 to a user (typically, a driver) of vehicle 100, and receives the user's operation. HMI 8 includes an instrument panel, a head-up display, a touch-panel display of a car navigation system, a smart speaker and the like, none of which are shown.

Accelerator position sensor 91 detects the degree of accelerator pedal depression made by the user as an accelerator position Acc, and outputs the result of detection to hybrid ECU 101. Vehicle speed sensor 92 detects the rotational speed of output shaft 41 as a vehicle speed V, and outputs the result of detection to hybrid ECU 101.

Each of hybrid ECU 101, engine ECU 102, and battery ECU 103 includes therein a central processing unit (CPU), a memory, and an input-output port, none of which are shown. Each ECU executes a predetermined computing process based on the information stored in the memory and the data from a corresponding sensor. Hybrid ECU 101, engine ECU 102, and battery ECU 103 are connected via a communication line 19. Hybrid ECU 101 performs overall control over vehicle 100 by two-way communicate with engine ECU 102 and battery ECU 103.

Specifically, hybrid ECU 101 calculates a driving force (user request power) that the user requests vehicle 100 to produce, based on accelerator position Acc, vehicle speed V, and the like. Hybrid ECU 101 generates and outputs an engine command signal to engine ECU 102, and also generates and outputs a first MG command signal and a second MG command signal to PCU 5, so that the user request power can be transmitted to drive wheel 42. Thus, engine ECU 102 controls the output of engine 1 (specifically, the throttle position, the ignition timing, and the amount of fuel injection etc.) so that the engine power will match the power instructed by the engine command signal. Also, PCU 5 controls the outputs of first MG 31 and second MG 32 (specifically, the amounts of current etc.) in accordance with the first MG command signal and the second MG command signal, respectively, from hybrid ECU 101.

In this embodiment, when some malfunction (e.g., an overvoltage) occurs in battery pack 7, hybrid ECU 101 controls vehicle 100 to perform limp-home traveling (fail-safe traveling), in which the electric power in battery pack 7 is not used. This limp-home traveling is hereinafter referred to as "battery-less traveling". In the battery-less traveling, hybrid ECU 101 controls SMR 6 to be OFF (open state) to electrically disconnect battery pack 7 from PCU 5. This state is referred to as a "battery-less state". In the battery-less state, hybrid ECU 101 controls vehicle 100 to use the output of engine 1 for traveling. In the battery-less state, hybrid ECU 101 may control vehicle 100 to travel by driving second MG 32 by the electric power generated by first MG 31 using the output of engine 1.

While ECU 10 is divided into three units in FIG. 1, the division of ECU 10 is not essential. Contrarily, ECU 10 may be divided into more (four or more) units according to function. For the sake of brevity, in the following description, hybrid ECU 101, engine ECU 102, and battery ECU 103 may be simply referred to as "ECU 10" without distinction.

<Layout of Battery Pack>

Figure 2:
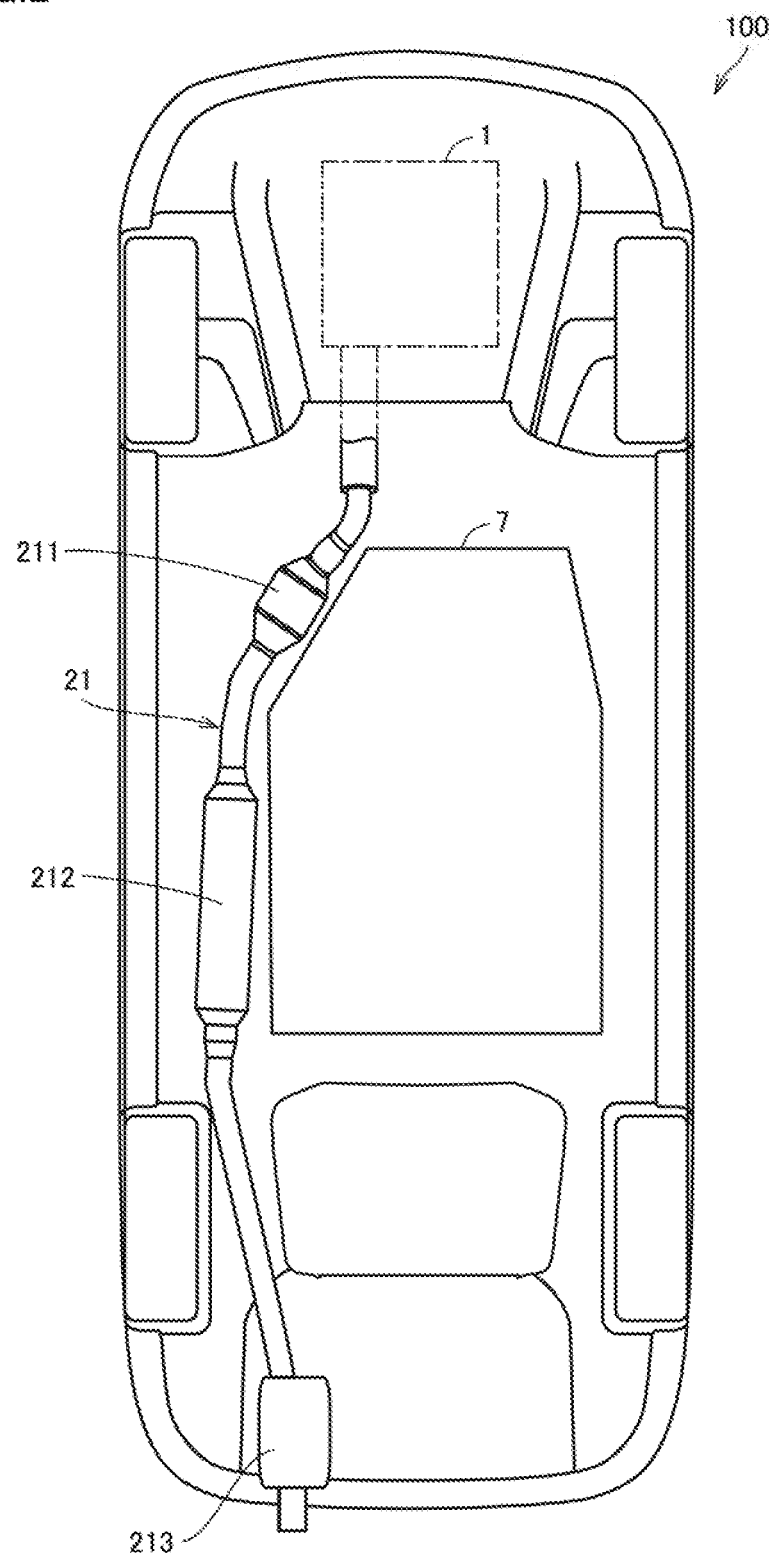
FIG. 2 is a view showing an example layout of an engine, an exhaust pipe, and a battery pack.

FIG. 2 is a view showing an example layout of engine 1, exhaust pipe 21, and battery pack 7. FIG. 2 shows a bottom view of vehicle 100 as seen from below. With reference to FIG. 2, engine 1 is located in an engine compartment at the front of vehicle 100. Muffler 213 is located at the rear of vehicle 100. Exhaust pipe 21 extends in the front-back direction of vehicle 100.

In this example, battery pack 7 is mounted under the floor outside the passenger compartment and located near exhaust pipe 21. Since the space between battery pack 7 and exhaust pipe 21 is narrow, the exhaust heat from engine 1 and radiating from exhaust pipe 21 heats battery pack 7 while vehicle 100 is traveling. A temperature rise of battery pack 7 may also occur during the battery-less traveling of vehicle 100.

In the bottom view of FIG. 2, battery pack 7 is located on the right in the figure, and exhaust pipe 21 is located on the left in the figure. However, battery pack 7 may be in any other location that can be affected by the radiant heat from exhaust pipe 21. The layout of battery pack 7 and exhaust pipe 21 is not limited to the one shown in FIG. 2.

<Output Suppression Control>

In this embodiment, "output suppression control" is executed, in which the output of engine 1 is suppressed as compared to normal times so as to appropriately protect battery pack 7 from the exhaust heat from engine 1 while allowing vehicle 100 to continue the battery-less traveling. By executing the output suppression control, the heat radiation from exhaust pipe 21 to battery pack 7 can be reduced as compared to when the output suppression control is not being executed (at normal times), thereby suppressing a temperature rise of battery pack 7. This prevents an excessive temperature rise of battery pack 7, thus protecting battery pack 7.

Figure 3:
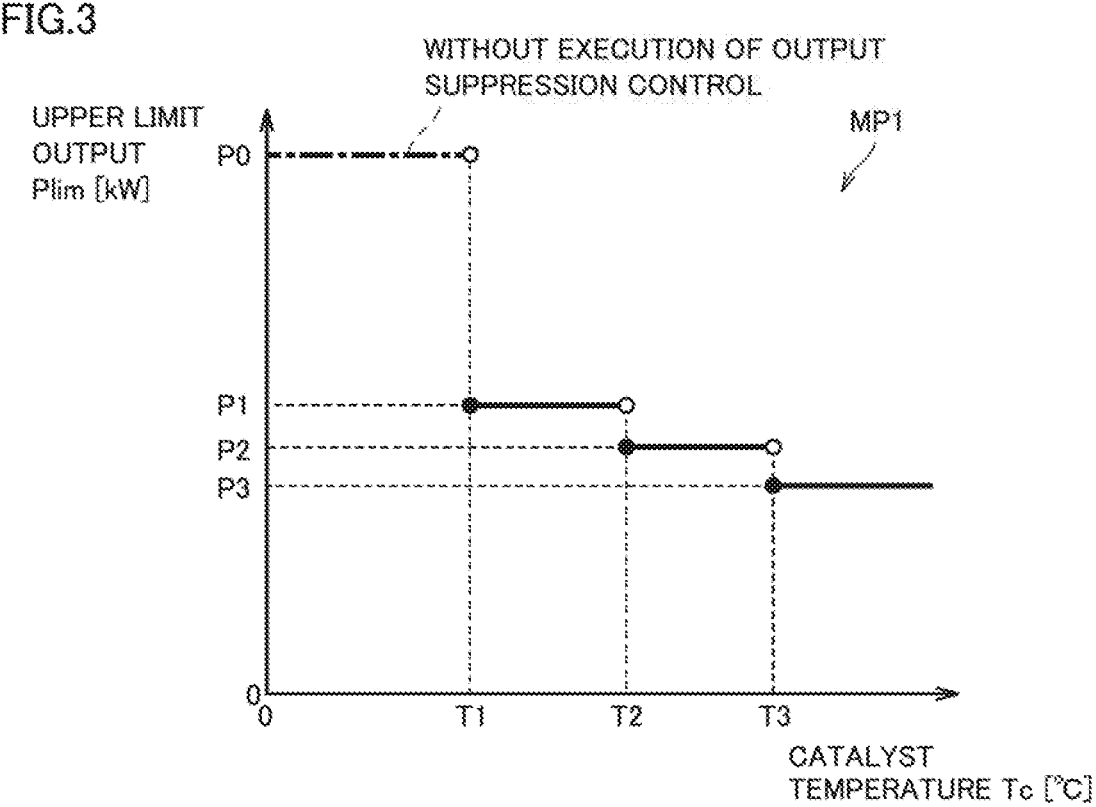
FIG. 3 is a graph for explaining an example of the output suppression control.

FIG. 3 is a graph for explaining an example of the output suppression control. The output of engine 1 is controlled to be a lower one of a request output Preq that engine 1 is requested to produce, and the upper limit of the output of engine 1 (hereinafter also referred to as "upper limit output Plim").

Figure 4:
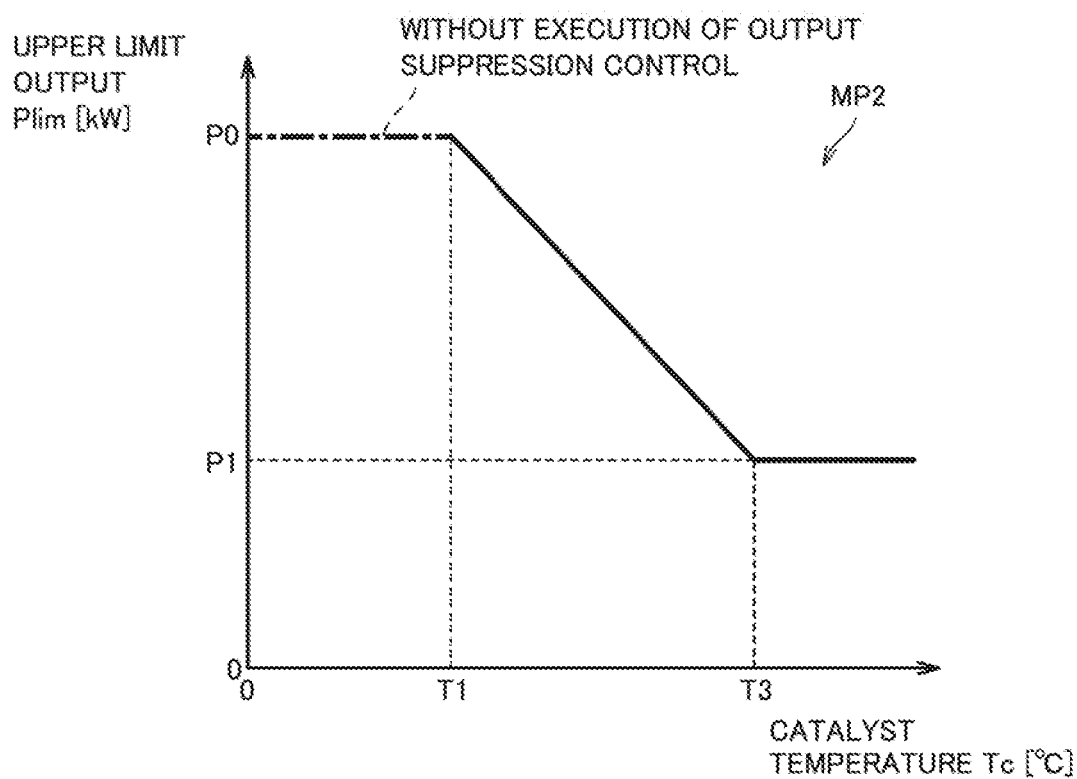
FIG. 4 is a graph for explaining another example of the output suppression control.

In FIG. 3 and later-described FIG. 4, upper limit output Plim is set in accordance with catalyst temperature Tc. The horizontal axis shows catalyst temperature Tc, and the vertical axis shows upper limit output Plim. The correspondence relationship between catalyst temperature Tc and upper limit output Plim as shown in FIG. 3 is predetermined and stored as a map MP1 in the memory of ECU 10; or the correspondence relationship as shown in FIG. 4 is stored as a map MP2 in the memory of ECU 10. ECU 10 can determine upper limit output Plim from catalyst temperature Tc by referring to map MP1 or map MP2.

In the example shown in FIG. 3, catalyst temperature Tc is sectioned into four temperature ranges. The four temperature ranges consist of: the temperature range of less than T1, the temperature range of not less than T1 and less than T2, the temperature range of not less than T2 and less than T3, and the temperature range of not less than T3.

In the temperature range of less than T1, the output of engine 1 is not limited by upper limit output Plim (i.e., the output suppression control is not executed), and upper limit output Plim is P0 (e.g., P0=131 kW). On the other hand, in the temperature ranges of not less than T1, the output suppression control is executed. In the temperature range of not less than T1 and less than T2, upper limit output Plim=P1 (e.g., P1=70 kW) is satisfied. In the temperature range of not less than T2 and less than T3, upper limit output Plim=P2 (e.g., P2=60 kW) is satisfied. In the temperature range of not less than T3, upper limit output Plim=P3 (e.g., P3=50 kW) is satisfied.

Thus, in the temperature ranges of not less than T1, the output suppression control is executed, in which the degree of reduction in upper limit output Plim is increased with an increase in catalyst temperature Tc. Accordingly, with respect to upper limit output Plim with no output suppression control, a higher degree of reduction in upper limit output Plim results in the output of engine 1 more easily reaching upper limit output Plim and thus being more easily limited by upper limit output Plim. This in turn results in a decrease in exhaust heat from engine 1 and accordingly in radiant heat from exhaust pipe 21, thereby highly effectively suppressing a temperature rise of catalyst temperature Tc. Therefore, battery pack 7 can be effectively protected from an excessive temperature rise. On the other hand, at a stage in which catalyst temperature Tc has not risen so significantly (e.g., in which catalyst temperature Tc is in the temperature range of not less than T1 and less than T2), the degree of reduction in upper limit output Plim is relatively low, so that the limp-home traveling performance of vehicle 100 can be ensured.

Sectioning catalyst temperature Tc into four temperature ranges as in FIG. 3 is merely an example. Catalyst temperature Tc may be sectioned into two temperature ranges. In this case, catalyst temperature Tc is sectioned into a temperature range in which the output suppression control is executed, and a temperature range in which the output suppression control is not executed. Alternatively, catalyst temperature Tc may be sectioned into three or five or more temperature ranges.

FIG. 4 is a graph for explaining another example of the output suppression control. In the example shown in FIG. 4, in a temperature range of not less than T1, upper limit output Plim linearly decreases as catalyst temperature Tc increases.

Thus, the mode of suppressing the output of engine 1 is not limited to the stepwise change as shown in FIG. 3, but may be any other mode, as long as upper limit output Plim monotonously decreases with an increase in catalyst temperature Tc. For example, upper limit output Plim may be linearly changed as shown in FIG. 4 or curvilinearly, though not shown.

<Time Chart of Engine Control>

Figure 5:
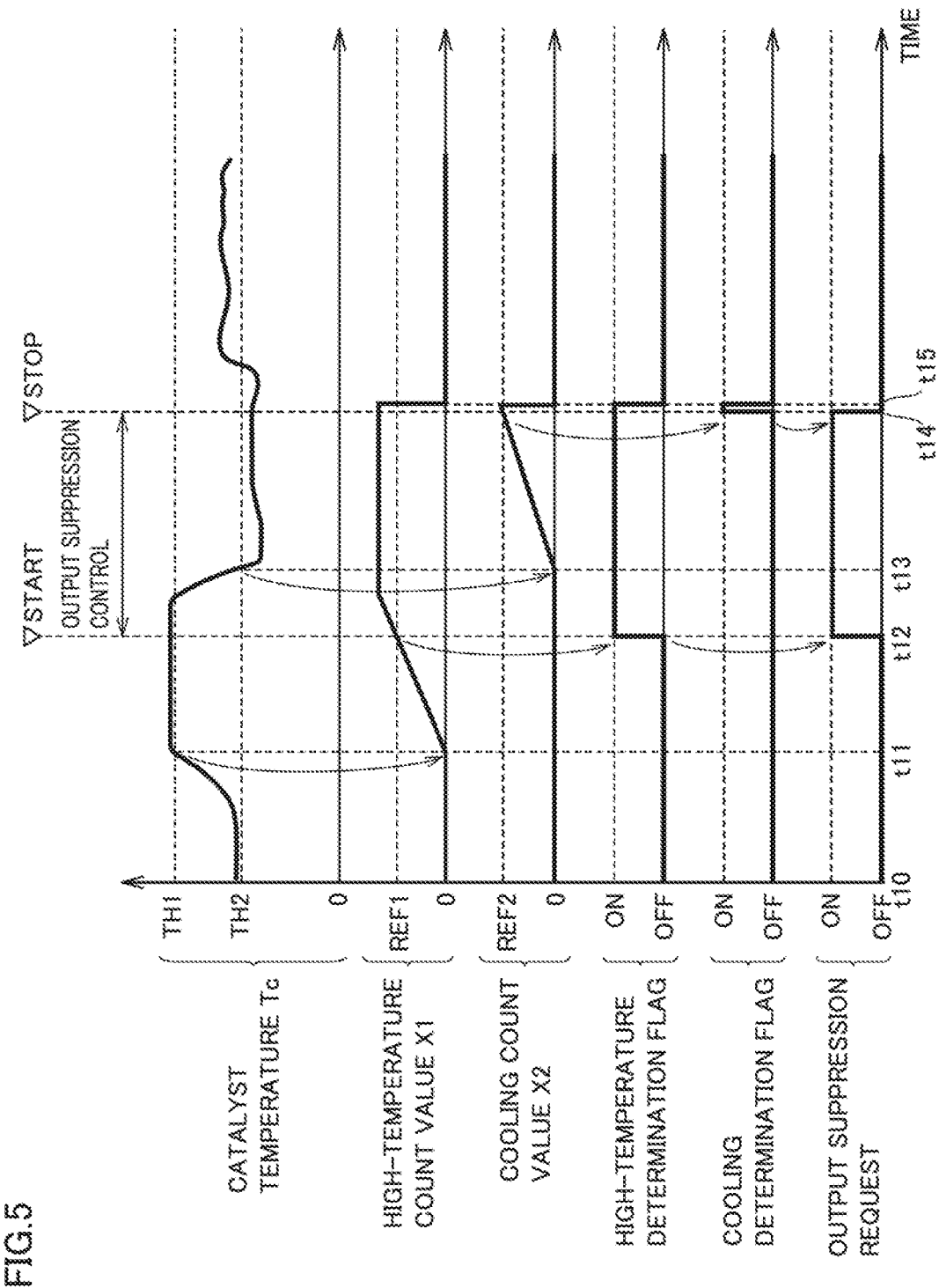
FIG. 5 is a time chart for explaining the output control of engine in embodiment 1.

FIG. 5 is a time chart for explaining the output control of engine 1 in embodiment 1. With reference to FIG. 5, the horizontal axis shows the elapsed time. The vertical axis shows catalyst temperature Tc, the value of the high-temperature counter, the value of the cooling counter, ON/OFF of the high-temperature determination flag, ON/OFF of the cooling determination flag, and ON/OFF of the output suppression request, in this order from the top.

For catalyst temperature Tc, a first threshold value TH1 and a second threshold value TH2 are predetermined. First threshold value TH1 is a value with which to determine that catalyst temperature Tc is a high temperature. Second threshold value TH2 is a value with which to determine that catalyst temperature Tc is a normal temperature. For example, first threshold value TH1 is 900° C., and second threshold value TH2 is 700° C.

For the value of the high-temperature counter (hereinafter referred to as "high-temperature count value X1"), a first reference value REF1 is predetermined with which to fix the determination that catalyst temperature Tc is a high temperature. For the value of the cooling counter (hereinafter referred to as "cooling count value X2"), a second reference value REF2 is predetermined with which to fix the determination that catalyst temperature Tc has already been cooled. For example, high-temperature count value X1 is a count value corresponding to four hours, and cooling count value X2 is a count value corresponding to one hour.

The output suppression request is a request output from hybrid ECU 101 to engine ECU 102 when hybrid ECU 101 determines that the output of engine 1 needs to be suppressed. In response to the output suppression request from hybrid ECU 101, engine ECU 102 controls engine 1 to suppress its output.

In the example shown in FIG. 5, at time t10, vehicle 100 is performing the battery-less traveling. Catalyst temperature Tc at time t10 is a temperature between first threshold value TH1 and second threshold value TH2. High-temperature count value X1 and cooling count value X2 are both 0. The high-temperature determination flag and the cooling determination flag are both OFF. Also, the output suppression request is OFF.

Continued output from engine 1 causes catalyst temperature Tc to rise to go above first threshold value TH1 at time t11. Then, high-temperature count value X1 is incremented during the time period in which catalyst temperature Tc is above first threshold value TH1.

High-temperature count value X1 continues to be incremented, until reaching first reference value REF1 at time t12. When catalyst temperature Tc is maintained at a high temperature of equal to or more than first threshold value TH1, battery pack 7 is likely to be at a high temperature due to the radiant heat from exhaust pipe 21. Therefore, the high-temperature determination flag is switched from OFF to ON. In response to the high-temperature determination flag switched to ON, hybrid ECU 101 outputs an output suppression request to engine ECU 102.

When receiving the output suppression request from hybrid ECU 101, engine ECU 102 reduces upper limit output Plim of engine 1 as compared to before receiving the output suppression request (see FIG. 3 or 4).

Then, the output of engine 1 decreases, thereby causing catalyst temperature Tc to decrease, so that catalyst temperature Tc goes below second threshold value TH2 at time t13. Then, cooling count value X2 is incremented during the time period in which catalyst temperature Tc is below second threshold value TH2.

When cooling count value X2 reaches second reference value REF2 at time t14, the cooling determination flag is switched from OFF to ON. In response to this, the output of the output suppression request from hybrid ECU 101 to engine ECU 102 is stopped (i.e., the output suppression control is canceled). After that, high-temperature count value X1 and cooling count value X2 are reset, and the high-temperature determination flag and the cooling determination flag are switched to OFF (time t15).

Catalyst temperature Tc corresponds to the "estimated temperature" in the present disclosure. In the example shown in FIG. 5, first threshold value TH1 corresponds to the "threshold value" in the present disclosure, and the time period from time t11 to time t12 corresponds to the "first predetermined time" in the present disclosure. Note that, as shown in the flowcharts described later, the feature "a state in which the estimated temperature is above the threshold value lasts longer than a first predetermined time" in the present disclosure is not limited to a situation in which catalyst temperature Tc is constantly above first threshold value TH1. Catalyst temperature Tc may be changed within the temperature range between first threshold value TH1 and second threshold value TH2 as long as catalyst temperature Tc does not go below second threshold value TH2. If catalyst temperature Tc is intermittently above first threshold value TH1 in this way, the integrated value of the time during which catalyst temperature Tc is above first threshold value TH1 may be defined as the "first predetermined time" in the present disclosure.

Second threshold value TH2 corresponds to "another threshold value" in the present disclosure, and the time period from time t13 to time t14 corresponds to the "second predetermined time" in the present disclosure. As with the "first predetermined time", the "second predetermined time" may also be the integrated value of the time during which catalyst temperature Tc is below second threshold value TH2.

<Flowchart of Engine Control>

Figure 6:
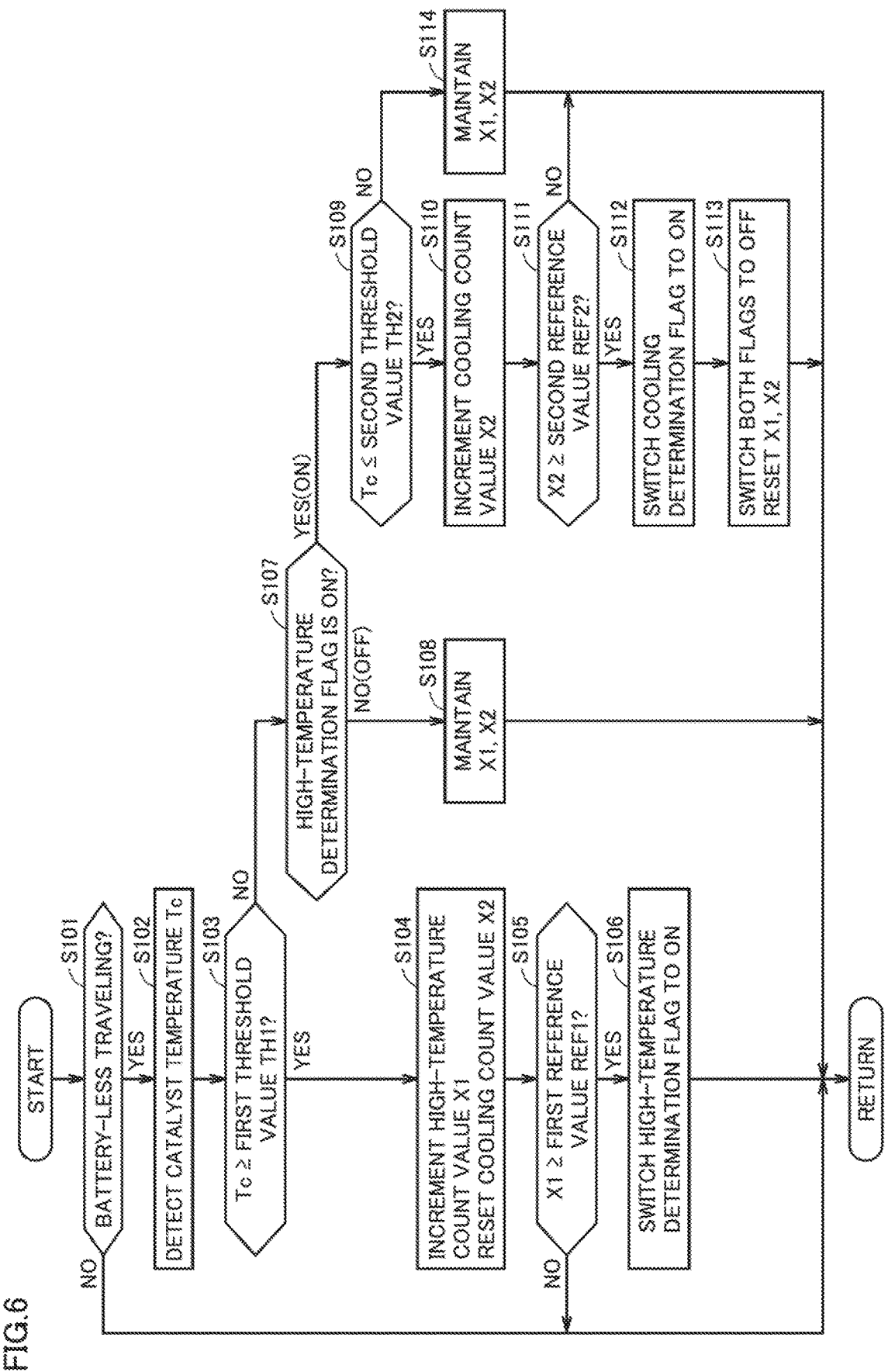
FIG. 6 is a flowchart showing the flag control of engine in embodiment 1.
Figure 12:
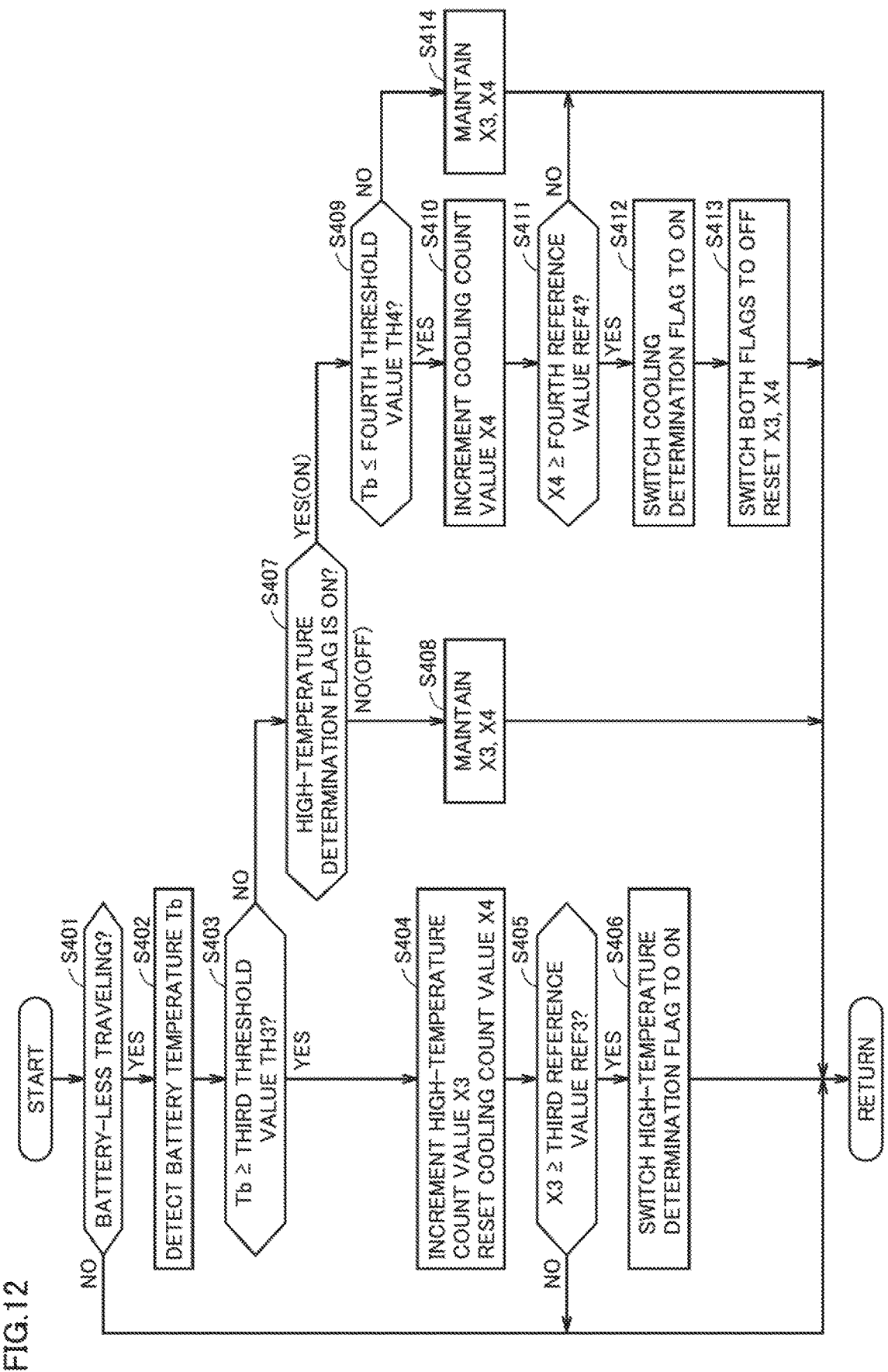
FIG. 12 is a flowchart showing the flag control of engine in embodiment 2.
Figure 14:
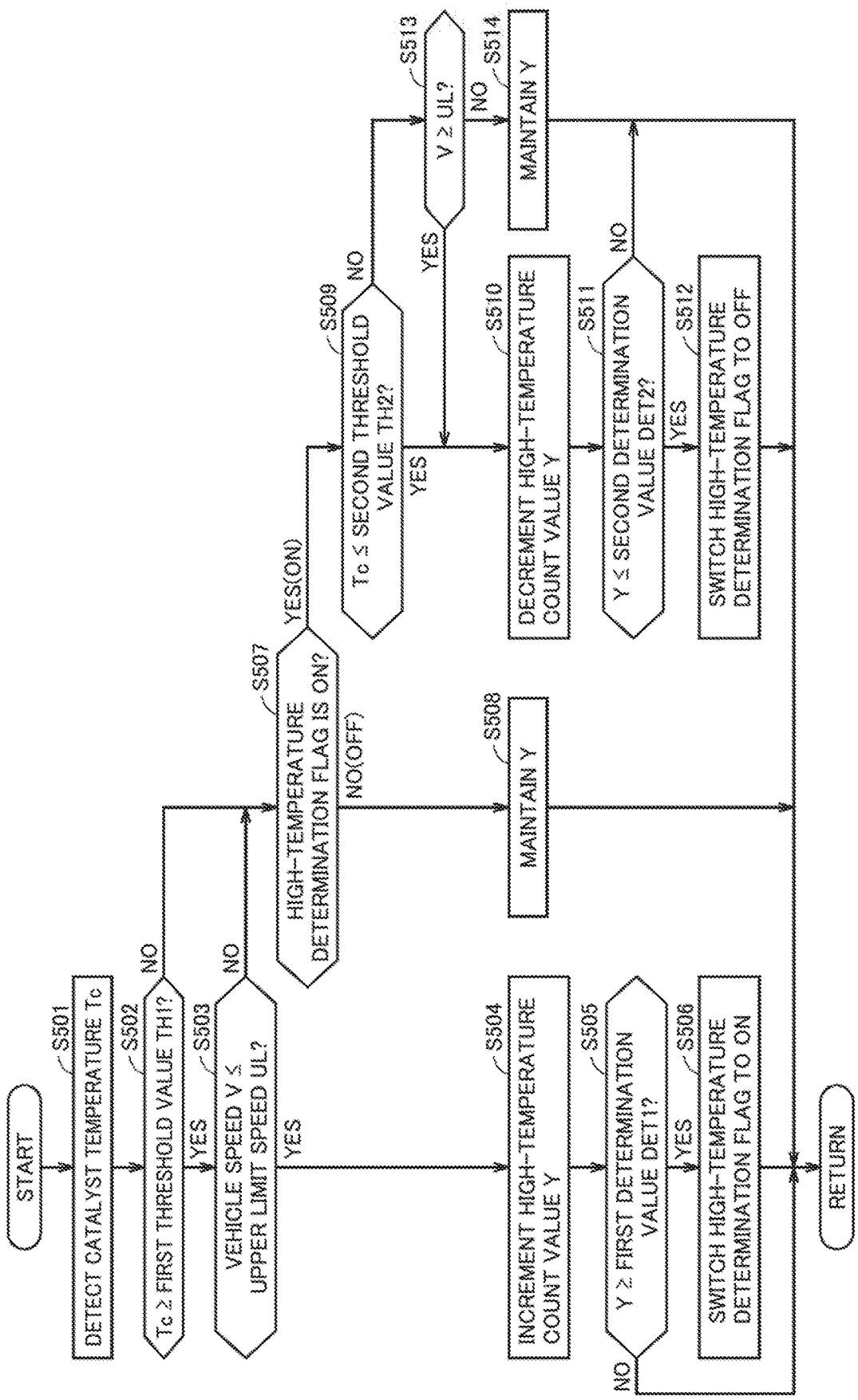
FIG. 14 is a flowchart showing the flag control of engine in embodiment 3.

FIG. 6 is a flowchart showing the flag control of engine 1 in embodiment 1. The flowcharts of FIG. 6 and later-described FIGS. 12 and 14 are implemented by a program stored in advance in the memory of ECU 10 being called on a predetermined control cycle from a main routine (not shown). Note that part or all of the processes of the steps may be implemented by dedicated hardware (electronic circuit). Hereinafter the steps are abbreviated as "S".

With reference to FIG. 6, at S101, ECU 10 determines whether or not vehicle 100 is performing the battery-less traveling. When vehicle 100 is not performing the battery-less traveling (NO at S101), the process is returned to the main routine.

When vehicle 100 is performing the battery-less traveling (YES at S101), ECU 10 obtains catalyst temperature Tc detected by catalyst temperature sensor 22 (S102). Catalyst temperature Tc obtained during a certain time period is temporarily stored in the memory of ECU 10 to be used for determining upper limit output Plim.

At S103, ECU 10 determines whether or not catalyst temperature Tc is equal to or more than first threshold value TH1. First threshold value TH1 is predetermined based on the correspondence relationship between catalyst temperature Tc and the battery pack 7 temperature. Specifically, the correspondence relationship between catalyst temperature Tc and the battery pack 7 temperature is experimentally obtained by taking into consideration the time delay (time lag) between the start of suppression of engine 1 output and the start of decrease in battery pack 7 temperature. This is because the battery pack 7 temperature does not necessarily decrease immediately upon the suppression of engine 1 output, due to the heat capacities of exhaust pipe 21 and battery pack 7. A temperature is determined that battery pack 7 preferably does not exceed from the viewpoint of protection of battery pack 7. Catalyst temperature Tc corresponding to the determined temperature can be set to first threshold value TH1.

When catalyst temperature Tc is equal to or more than first threshold value TH1 (YES at S103), ECU 10 increments high-temperature count value X1 (S104) (see time t11 in FIG. 5). ECU 10 resets cooling count value X2 to 0.

At S105, ECU 10 determines whether or not high-temperature count value X1 is equal to or more than first reference value REF1. First reference value REF1 can be determined as follows. If a rise in catalyst temperature Tc is only temporary, an excessive temperature rise of battery pack 7 will not occur, since there is a time lag between a rise in catalyst temperature Tc and a rise in battery pack 7 temperature. Accordingly, first reference value REF1 is experimentally determined to be a time period such that, if catalyst temperature Tc equal to or more than first threshold value TH1 continues for the time period, the temperature of battery pack 7 would significantly rise (e.g., four hours). The determined time period is then divided by the control cycle of a series of processes.

When high-temperature count value X1 is less than first reference value REF1 (NO at S105), ECU 10 returns the process to the main routine. Then, high-temperature count value X1 continues to be incremented during the time period in which catalyst temperature Tc is equal to or more than first threshold value TH1. When high-temperature count value X1 becomes equal to or more than first reference value REF1 (YES at S105), ECU 10 switches the high-temperature determination flag from OFF to ON (S106) (see time t12 in FIG. 5). In response to this, the output suppression control is executed. If ECU 10 is not executing the output suppression control, ECU 10 starts the output suppression control; whereas if ECU 10 is executing the output suppression control, ECU 10 continues the output suppression control.

When catalyst temperature Tc detected at S102 is less than first threshold value TH1 (NO at S103), ECU 10 moves the process to S107 and determines whether or not the high-temperature determination flag is ON. A determination of "NO" at S103 is not limited to a case in which catalyst temperature Tc increases to switch the high-temperature determination flag to ON and then decreases as a result of the execution of the output suppression control. A determination of "NO" at S103 may also be a case with no output suppression control executed (e.g., a case in which catalyst temperature Tc has not increased above first threshold value TH1, or a case in which catalyst temperature Tc increased but it was only temporary and has decreased without the execution of the output suppression control).

When the high-temperature determination flag is OFF (NO at S107), ECU 10 maintains high-temperature count value X1 and cooling count value X2 (S108). Then, the process is returned to the main routine.

When the high-temperature determination flag is ON (YES at S107), ECU 10 determines whether or not catalyst temperature Tc is equal to or less than second threshold value TH2 (S109). Second threshold value TH2 may be determined to be such a catalyst temperature Tc that is experimentally confirmed to decrease the temperature of battery pack 7 to such a level as to protect battery pack 7.

While catalyst temperature Tc is above second threshold value TH2 during execution of the output suppression control (NO at S109), cooling count value X2 is maintained. High-temperature count value X1 is also maintained at a value in the process of counting, without being reset (S114). Then, ECU 10 returns the process to the main routine.

When catalyst temperature Tc becomes equal to or less than second threshold value TH2 (YES at S109), ECU 10 increments cooling count value X2 (S110) (see time t13 in FIG. 5).

At S111, ECU 10 determines whether or not cooling count value X2 is equal to or more than second reference value REF2. Second reference value REF2 may be set by dividing a time period based on which a decrease in catalyst temperature Tc can be determined to be not temporary (e.g., one hour), by the control cycle of the process.

When cooling count value X2 is less than second reference value REF2 (NO at S111), ECU 10 returns the process to the main routine. Then, cooling count value X2 continues to be incremented until reaching second reference value REF2 during the time period in which catalyst temperature Tc is equal to or more than second threshold value TH2. When cooling count value X2 becomes equal to or more than second reference value REF2 (YES at S111), ECU 10 switches the cooling determination flag from OFF to ON (S112) (see time t14 in FIG. 5). In response to this, the output suppression control is stopped (i.e., the suppression of output is canceled). Then, ECU 10 switches the high-temperature determination flag and the cooling determination flag to OFF, and resets high-temperature count value X1 and cooling count value X2 (S113) (see time t15 in FIG. 5).

Figure 7:
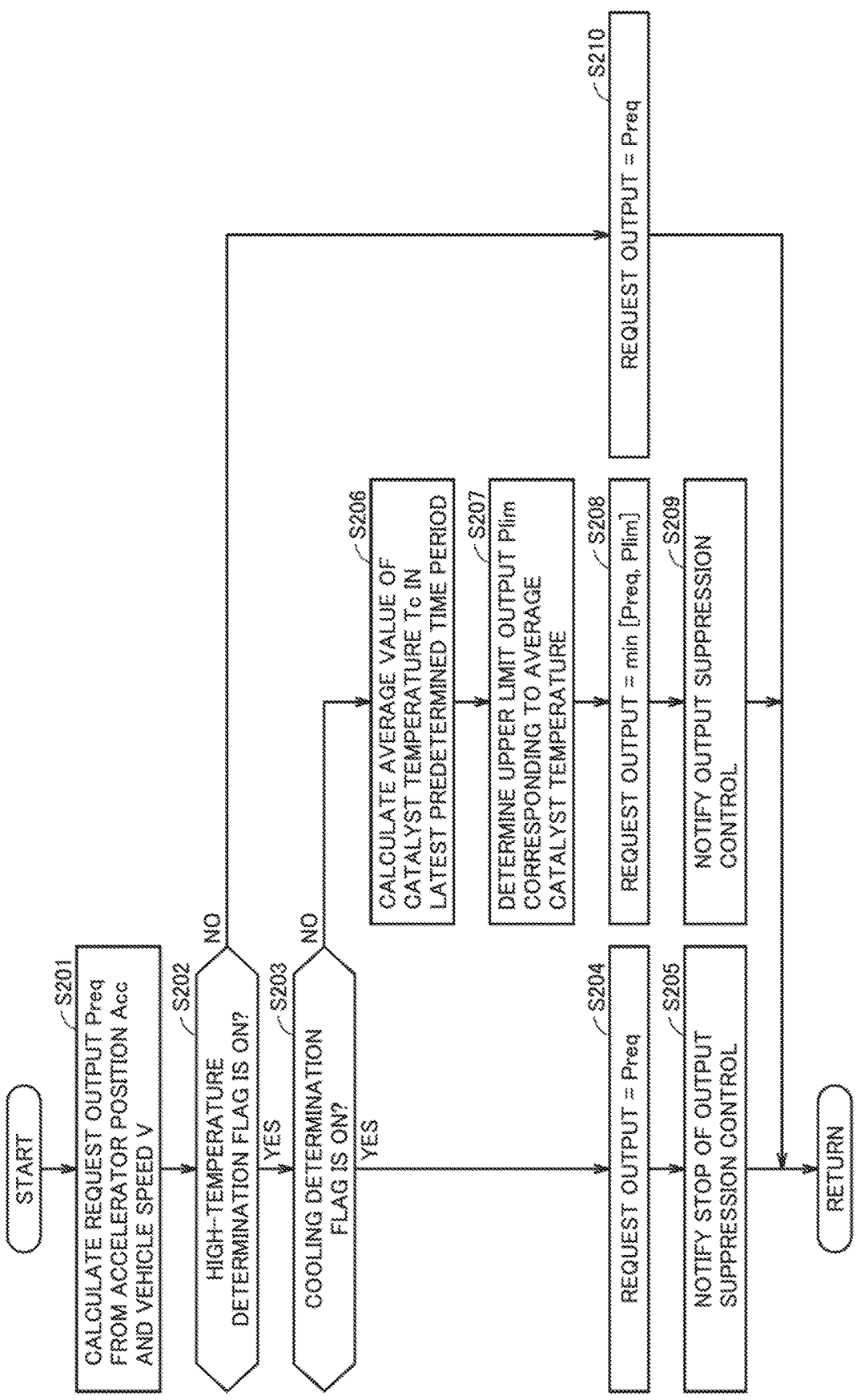
FIG. 7 is a flowchart showing the output control of engine in embodiment 1.

FIG. 7 is a flowchart showing the output control of engine 1 in embodiment 1. With reference to FIG. 7, at S201, ECU 10 calculates a provisional value of request output Preq for engine 1, based on accelerator position Acc detected by accelerator position sensor 91 and vehicle speed V detected by vehicle speed sensor 92.

At S202, ECU 10 determines whether or not the high-temperature determination flag is ON. When the high-temperature determination flag is OFF and the output suppression control is not being executed (No at S202), ECU 10 fixes request output Preq calculated at S201 as request output for engine 1 (S210).

When the high-temperature determination flag is ON (YES at S202), ECU 10 determines whether or not the cooling determination flag is ON (S203). When the high-temperature determination flag is ON while the cooling determination flag is OFF (NO at S203), ECU 10 moves the process to S206.

At S206, ECU 10 reads catalyst temperature Tc stored in the memory and calculates the average value of catalyst temperature Tc in the latest predetermined time period (e.g., one hour).

At S207, ECU 10 determines upper limit output Plim corresponding to the average value of catalyst temperature Tc by referring to map MP1 (see FIG. 3). ECU 10 may use map MP2 (see FIG. 4) instead of map MP1.

At S208, ECU 10 compares request output Preq calculated at S201 with upper limit output Plim, and determines a lower one of request output Preq and upper limit output Plim to be a definite value of request output Preq for engine 1.

At S209, ECU 10 controls HMI 8 to notify that the output suppression control is being executed. The user receiving the notification can recognize that the output of engine 1 is being suppressed. This can reduce the user's sense of discomfort that would be caused by the decrease in limp-home traveling performance.

When the cooling determination flag is ON at S203 (YES at S203), catalyst temperature Tc is continuously decreasing as a result of the output suppression control. Accordingly, ECU 10 fixes request output Preq calculated at S201 as a request output for engine 1 as normal (S204).

At S205, ECU 10 controls HMI 8 to notify that the output suppression control has been stopped. The user can thus understand the reason why the output of engine 1 has increased. This can reduce the user's sense of discomfort that would be caused by the recovery of limp-home traveling performance.

As above, in embodiment 1, when catalyst temperature Tc is above first threshold value TH1 during the battery-less traveling of vehicle 100, the output of engine 1 is decreased as compared to before catalyst temperature Tc goes above first threshold value TH1. The decrease in engine output causes a decrease in temperature of exhaust pipe 21, thereby reducing the radiant heat from exhaust pipe 21 and suppressing a temperature rise of battery pack 7. Therefore, embodiment 1 can protect battery pack 7 while allowing vehicle 100 to continue the battery-less traveling.

The "estimated temperature" in the present disclosure is not limited to catalyst temperature Tc (the bed temperature of catalyst), but may be, for example, the temperature of exhaust gas flowing through exhaust pipe 21. Alternatively, an engine temperature that can be estimated from the operational status of engine 1 and the driving force of vehicle 100 may be defined as the "estimated temperature". Further alternatively, a catalyst temperature Tc that can be estimated from the operational status of engine 1 and the driving force of vehicle 100 may be defined as the "estimated temperature". ECU 10 can determine the operational status of engine 1 by any of known methods based on the outputs from accelerator position sensor 91, vehicle speed sensor 92, an engine rotational speed sensor, an airflow sensor, an intake pressure sensor and the like, none of which are shown.

In the case described in FIG. 6, the output suppression control is executed during the battery-less traveling of vehicle 100. During the battery-less traveling, vehicle 100 relies only on the output of engine 1 for traveling, leading to a large request output Preq for engine 1. This results in a larger amount of radiant heat from exhaust pipe 21 and thus is likely to cause a greater temperature rise of battery pack 7, as compared to during normal traveling. Therefore, during the battery-less traveling, the output suppression control is particularly effective in preventing a temperature rise of battery pack 7.

[Variation 1 of Embodiment 1] Embodiment 1 describes an example in which the degree of suppression of engine 1 output depends on catalyst temperature Tc (see FIGS. 3 and 4). Variation 1 of embodiment 1 describes an example in which the degree of suppression of engine 1 output depends not only on catalyst temperature Tc but also on vehicle speed V.

With battery pack 7 being placed outside the passenger compartment of vehicle 100 on its bottom face (see FIG. 2), vehicle 100 traveling at a higher vehicle speed V causes a stronger traveling wind blowing against battery pack 7, thereby causing a larger amount of heat radiation from battery pack 7. This makes the battery pack 7 temperature less likely to rise even with the radiant heat from exhaust pipe 21. As a result, there is less need to suppress the output of engine 1.

Figure 8:
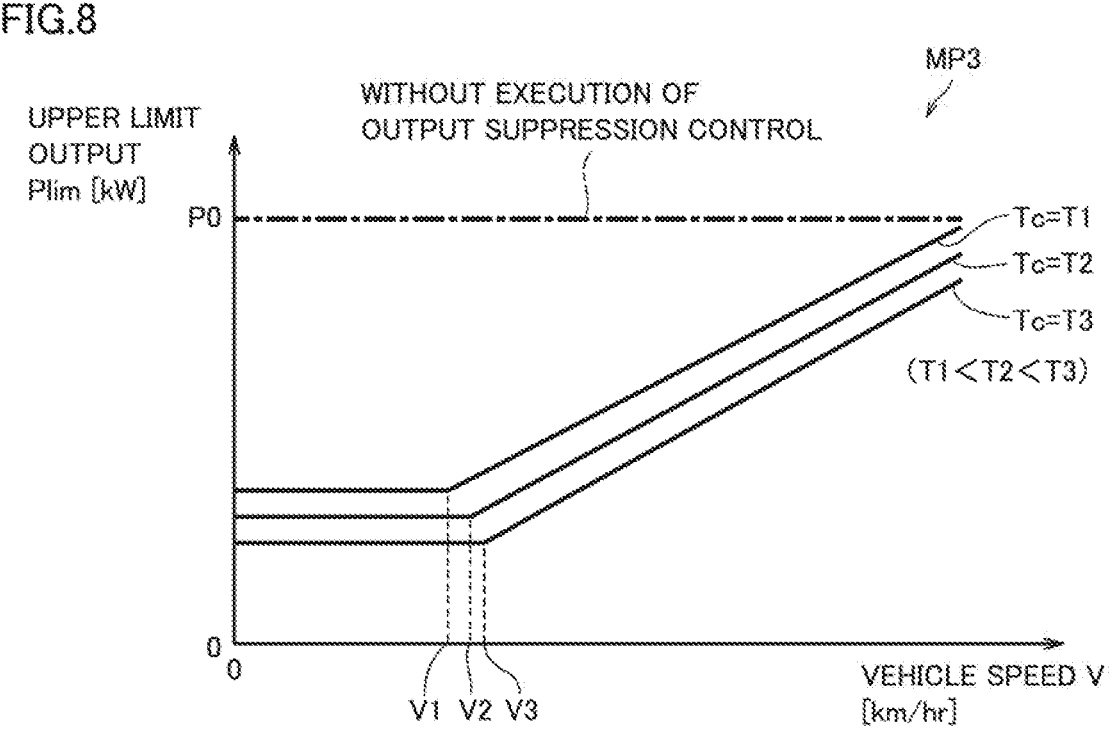
FIG. 8 is a graph for explaining the dependence of the upper limit output on the catalyst temperature and on the vehicle speed.

FIG. 8 is a graph for explaining the dependence of upper limit output Plim on the catalyst temperature and on the vehicle speed. In FIG. 8, the horizontal axis shows vehicle speed V, and the vertical axis shows upper limit output Plim of engine 1. V1 to V3 belong to a speed range of low or medium speeds (e.g., a speed range of less than 60 km per hour).

As shown in a map MP3 of FIG. 8, when vehicle speed V is equal to or less than predetermined speeds V1 to V3, upper limit output Plim depends on catalyst temperature Tc (upper limit output Plim decreases with an increase in catalyst temperature Tc), but does not depend on vehicle speed V.

However, in a high speed range of vehicle speed V (e.g., a speed range of not less than 60 km per hour), upper limit output Plim depends on both catalyst temperature Tc and vehicle speed V. Upper limit output Plim decreases with an increase in catalyst temperature Tc, and increases with an increase in vehicle speed V.

Figure 9:
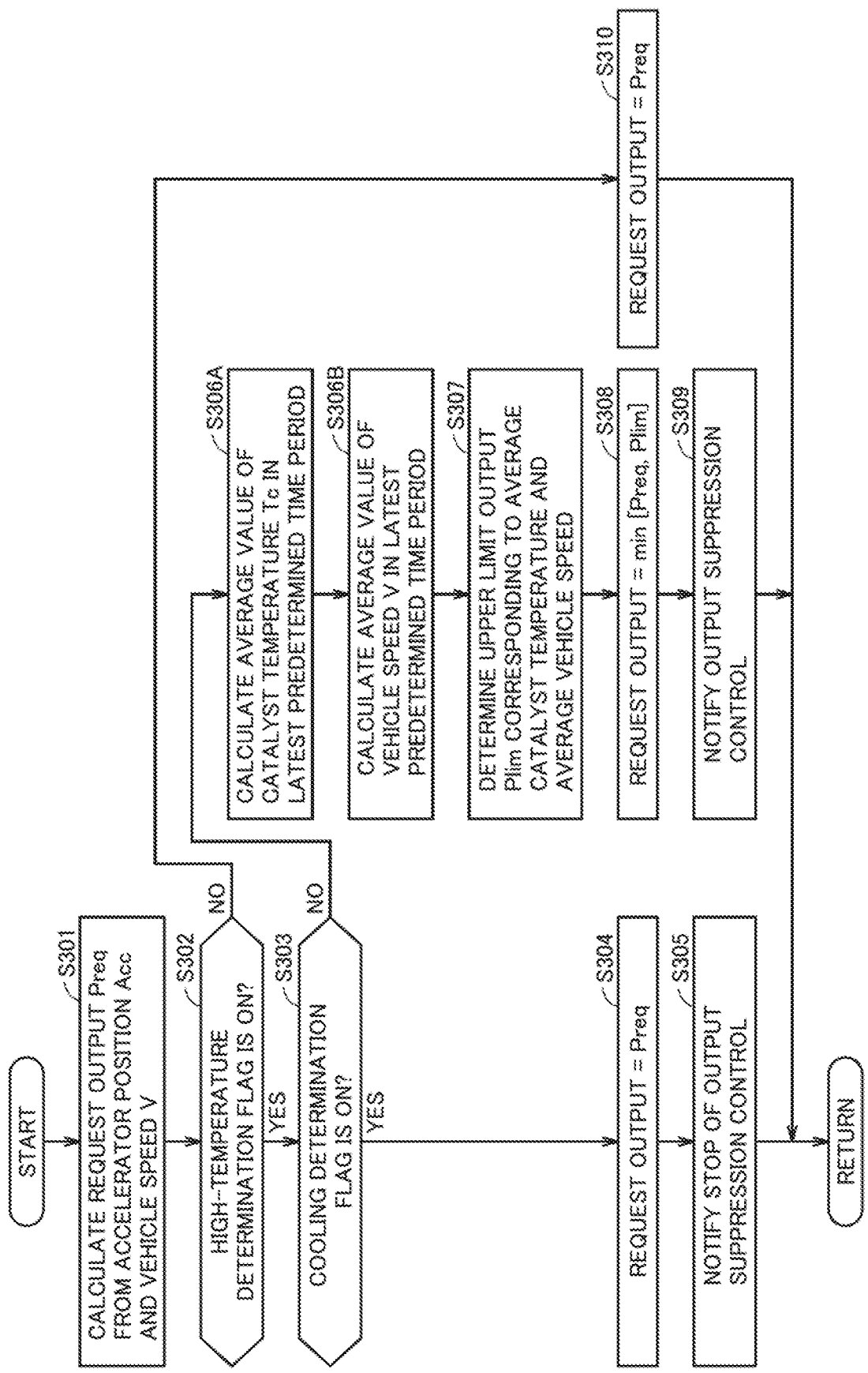
FIG. 9 is a flowchart showing the output suppression control in variation 1 of embodiment 1.

FIG. 9 is a flowchart showing the output control of engine 1 in variation 1 of embodiment 1. The overall flowchart of the output control of engine 1 in variation 1 of embodiment 1 is the same as that of the flowchart described in embodiment 1 (see FIG. 6), and thus the description thereof is not repeated. The flowchart shown in FIG. 9 is different from the flowchart in embodiment 1 (see FIG. 7) in that the process of S306B is additionally included and in that the process of S207 is replaced by the process of S307.

With reference to FIG. 9, when the high-temperature determination flag is ON while the cooling determination flag is OFF (NO at S303), ECU 10 calculates the average value of catalyst temperature Tc in the latest predetermined time period (e.g., one hour) (S306A).

At S306B, ECU 10 calculates the average value of vehicle speed V in the latest another predetermined time period (e.g., several minutes).

At S307, ECU 10 determines upper limit output Plim corresponding to the combination of the average value of catalyst temperature Tc and the average value of vehicle speed V by referring to map MP3 (see FIG. 8).

At S308, ECU 10 compares request output Preq provisionally calculated at S301 with upper limit output Plim determined at S307, and fixes a lower one of request output Preq and upper limit output Plim as request output Preq for engine 1.

As above, in variation 1 of embodiment 1, the output of engine 1 during the output suppression control is set in accordance with not only catalyst temperature Tc but also vehicle speed V. As vehicle speed V of vehicle 100 is higher, the traveling wind blowing against battery pack 7 provides better cooling effect on battery pack 7. Accordingly, when vehicle speed V of vehicle 100 is more than a predetermined speed (any of V1 to V3 in FIG. 8), the degree of suppression of engine 1 output can be reduced as compared to when vehicle speed V is less than the predetermined speed. Thus, variation 1 of embodiment 1 can provide better performance of the battery-less traveling of vehicle 100 than embodiment 1.

[Variation 2 of Embodiment 1]

In embodiment 1 and its variation 1 described above, during the execution of the output suppression control, upper limit output Plim of engine 1 is decreased as compared to when the output suppression control is not being executed. In variation 2 of embodiment 1, the output suppression control is implemented by changing request output Preq for engine 1.

Figure 10:
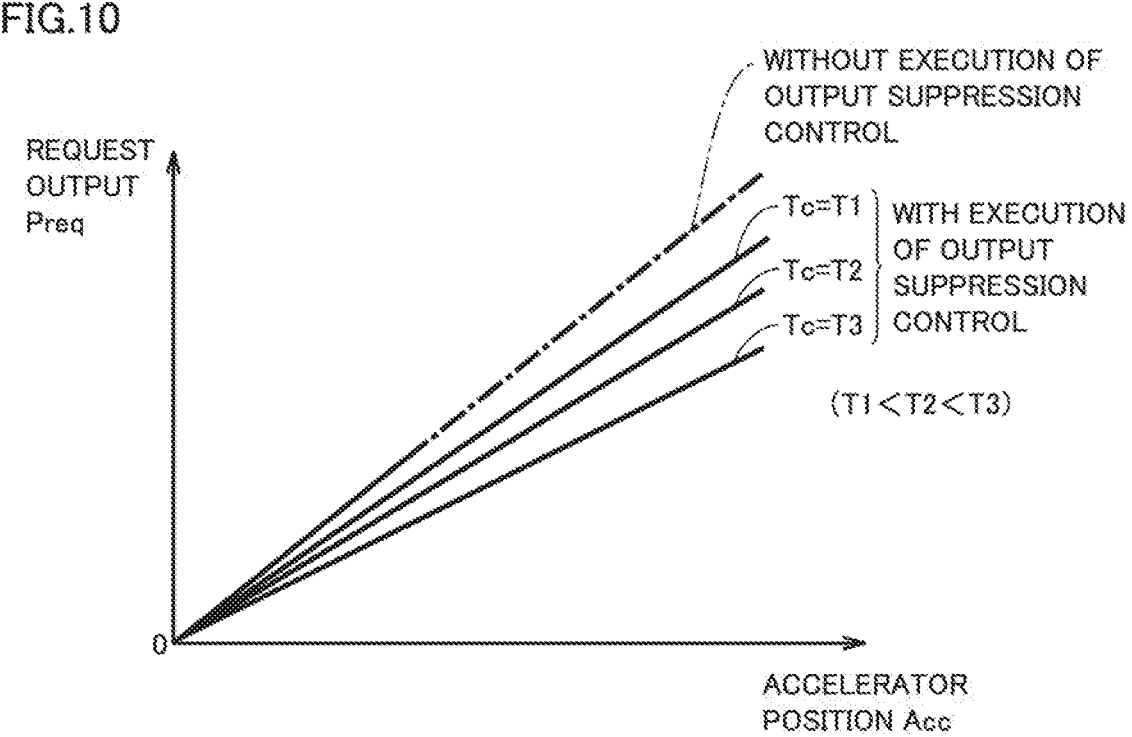
FIG. 10 is a graph for explaining an example of the output suppression control in variation 2 of embodiment 1.

FIG. 10 is a graph for explaining an example of the output suppression control in variation 2 of embodiment 1. With reference to FIG. 10, the horizontal axis shows accelerator position Acc, and the vertical axis shows request output Preq for engine 1.

When the output suppression control is not being executed, accelerator position Acc and request output Preq satisfy the linear relationship as indicated by the alternate long and short dash line. On the other hand, when the output suppression control is being executed, in the temperature ranges of not less than T1, the degree of increase in request output Preq with an increase in accelerator position Acc (=the gradient of straight line) is reduced (see the solid line), in the example shown in FIG. 10. In other words, when the output suppression control is being executed, request output Preq is reduced for a given accelerator position Acc, as compared to when the output suppression control is not being executed.

Thus, the suppression of engine 1 output is not limited to through a decrease in upper limit output Plim, but may be through a decrease in request output Preq. Since the output of engine 1 is controlled by a lower one of request output Preq and upper limit output Plim as described above, the suppression of engine 1 output can also be achieved through a decrease in request output Preq. As in embodiment 1 and its variation 1, variation 2 of embodiment 1 can also protect battery pack 7 from an excessive temperature rise while allowing vehicle 100 to continue the battery-less traveling.

Although not shown, in the output suppression control in variation 2 of embodiment 1, the relationship between accelerator position Acc and request output Preq may have the dependency on the vehicle speed as described in variation 1 of embodiment 1. Specifically, for a given accelerator position Acc, a higher vehicle speed V allows a higher request output Preq within the range of request output Preq of no output suppression control.

Embodiment 2

Embodiment 1 describes a case in which the start and stop of the output suppression control depend on catalyst temperature Tc. However, in order to determine whether to execute the output suppression control, the use of catalyst temperature Tc is not essential. Embodiment 2 describes a case in which the output suppression control is based on the temperature of battery pack 7.

Figure 11:
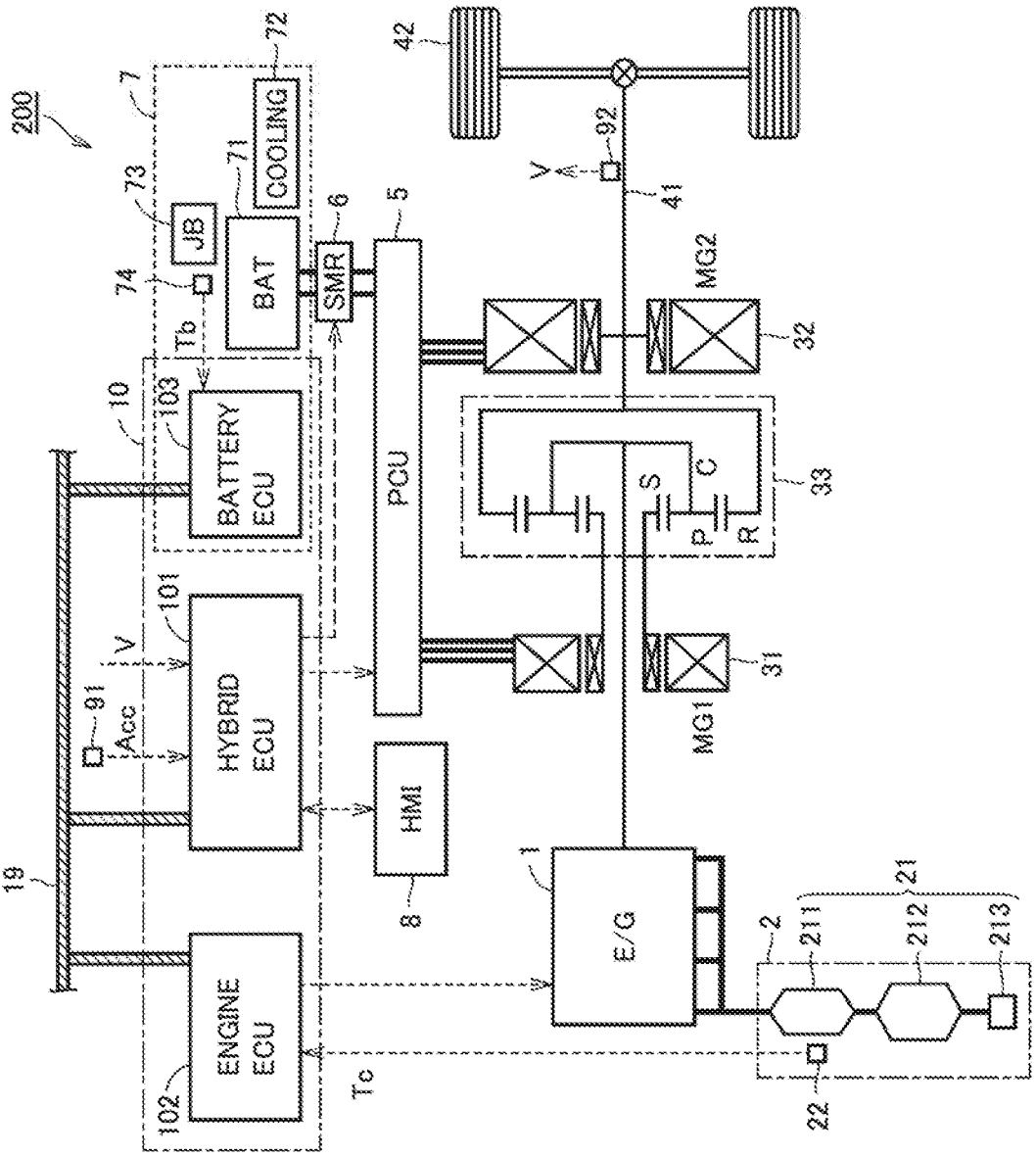
FIG. 11 is a block diagram schematically showing a general configuration of a hybrid vehicle in embodiment 2.

FIG. 11 is a block diagram schematically showing a general configuration of a hybrid vehicle in embodiment 2. With reference to FIG. 11, in embodiment 2, battery ECU 103 is provided inside battery pack 7. Battery pack 7 includes not only assembled battery 71 but also a cooling system 72, a junction box 73, and a battery temperature sensor 74. The other configuration of vehicle 200 is the same as that of vehicle 100 in embodiment 1, and thus the detailed description thereof is not repeated.

Cooling system 72 circulates coolant (not shown) to cool assembled battery 71. However, cooling system 72 is not limited to a liquid-cooling system, but may be an air-cooling system.

Junction box 73 is a protective box for a terminal for coupling or branching a wire harness (not shown) in battery pack 7.

Battery temperature sensor 74 detects the temperature of assembled battery 71 (hereinafter also referred to as "battery temperature Tb"), and outputs the result of detection to battery ECU 103.

While assembled battery 71 is cooled by cooling system 72, junction box 73 and battery ECU 103 are not cooled by cooling system 72. Accordingly, the temperature (battery temperature Tb) of assembled battery 71 detected by battery temperature sensor 74 is not necessarily the same as the temperature of junction box 73 and battery ECU 103. In some cases, assembled battery 71 may be at a low temperature, while junction box 73 and battery ECU 103 may be at a high temperature. Also, there may be a time lag between battery temperature Tb and the temperature of junction box 73 and battery ECU 103. In view of this, a high-temperature determination flag and a low-temperature determination flag are used that are set by taking the time lag into consideration.

Junction box 73 and battery ECU 103 correspond to "equipment" in the present disclosure. The "equipment" may include, for example, a service plug for inspecting battery pack 7, a fuse for preventing an overcurrent in assembled battery 71, a small-size ECU (satellite ECU) for detecting the voltage of assembled battery 71, none of which are shown.

FIG. 12 is a flowchart showing the flag control of engine 1 in embodiment 2. With reference to FIG. 12, during the battery-less traveling of vehicle 100 (YES at S401), ECU 10 obtains battery temperature Tb detected by battery temperature sensor 74 (S402).

When battery temperature Tb is equal to or more than a third threshold value TH3 (corresponding to the "threshold value" in the present disclosure) (YES at S403), ECU 10 moves the process to S404. The processes of S404 to S406 are similar to the corresponding processes in embodiment 1 (see FIG. 6) except that high-temperature count value X1 and cooling count value X2 are respectively replaced by a high-temperature count value X3 and a cooling count value X4, and except that first reference value REF1 is replaced by a third reference value REF3. High-temperature count value X3, cooling count value X4, and third reference value REF3 may be predetermined in accordance with the correspondence relationship between battery temperature Tb and the temperature of junction box 73 and battery ECU 103 (i.e., the presence or absence of the cooling effect provided by cooling system 72). As concrete means for the output suppression control (S406) in embodiment 2, the same means as that in embodiment 1 and its variations 1 and 2 may be employed (see FIG. 3, 4, 8, or 10).

After that, while the high-temperature determination flag is ON (YES at S407), when battery temperature Tb becomes equal to or less than a fourth threshold value TH4 (corresponding to "another threshold value" in the present disclosure) (YES at S409), ECU 10 moves the process to S410. The processes of S410 to S413 are also similar to the corresponding processes in embodiment 1 (see FIG. 6) except that second reference value REF2 is replaced by a fourth reference value REF4.

As above, in embodiment 2, when battery temperature Tb is above third threshold value TH3 during the battery-less traveling of vehicle 100, the output of engine 1 is decreased as compared to before battery temperature Tb goes above third threshold value TH3. Since battery pack 7 is not charged and discharged during the battery-less traveling, a temperature rise of battery pack 7 during the battery-less traveling is considered to be due to the radiant heat from exhaust pipe 21. Accordingly, whether the temperature of battery pack 7 has risen due to the radiant heat can be estimated from the temperature of battery pack 7. Suppressing the output of engine 1 causes a decrease in the temperature of exhaust pipe 21, thereby reducing the radiant heat from exhaust pipe 21 and suppressing a temperature rise of battery pack 7. Therefore, embodiment 2 can protect battery pack 7 while allowing vehicle 100 to continue the battery-less traveling, as with embodiment 1.

Embodiment 3

Embodiment 1 describes an example with two counters (high-temperature counter and cooling counter). Embodiment 3 describes an example with one counter, which is a combination of the two counters (this counter is also referred to as a high-temperature counter). The hybrid vehicle in embodiment 3 has the same configuration as vehicle 100 in embodiment 1 (see FIGS. 1 and 2), and thus the detailed description thereof is not repeated.

<Time Chart of Engine Control>

Figure 13:
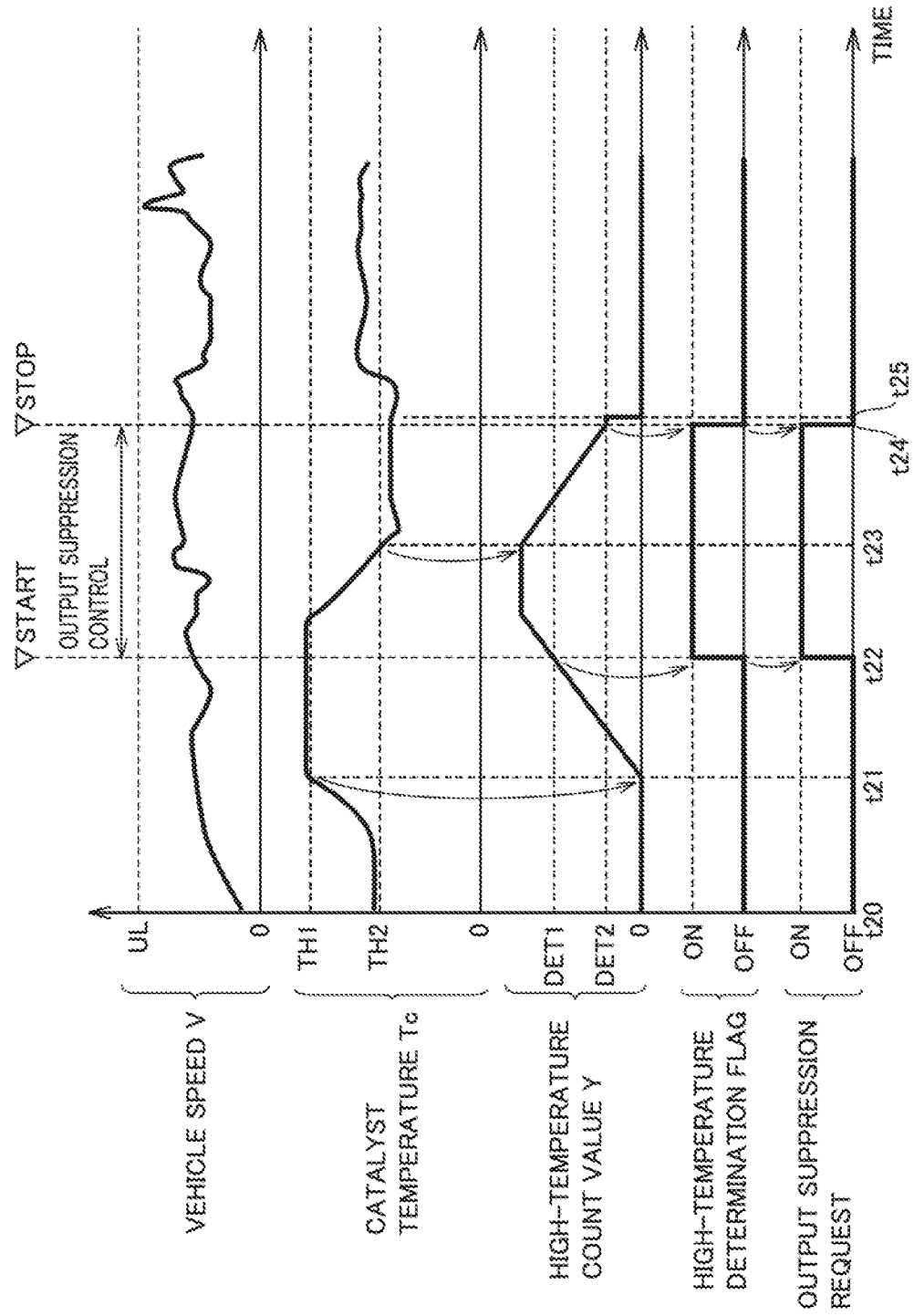
FIG. 13 is a time chart for explaining the output control of engine in embodiment 3.

FIG. 13 is a time chart for explaining the output control of engine 1 in embodiment 3. With reference to FIG. 13, the horizontal axis shows the elapsed time. The vertical axis shows vehicle speed V, catalyst temperature Tc, the value of the high-temperature counter, ON/OFF of the high-temperature determination flag, and ON/OFF of the output suppression request, in this order from the top. Being compared with embodiment 1, embodiment 3 does not have a cooling counter and a cooling determination flag.

Vehicle 100 traveling at a higher vehicle speed V receives a stronger traveling wind, thereby allowing battery pack 7 placed outside the passenger compartment to be cooled more easily. In view of this, in embodiment 3, when vehicle speed V is equal to or less than a predetermined upper limit speed UL (e.g., UL=50 km per hour), the high-temperature counter counts up (i.e., the high-temperature count value is incremented). This is because, with such a vehicle speed, battery pack 7 may rise to a high temperature. In the example shown in FIG. 13, it is assumed that vehicle speed V is constantly below upper limit speed UL.

For catalyst temperature Tc, first threshold value TH1 and second threshold value TH2 are predetermined. First threshold value TH1 is a value with which to determine that catalyst temperature Tc is a high temperature. Second threshold value TH2 is a value with which to determine that catalyst temperature Tc is a normal temperature. For the value of the high-temperature counter (hereinafter referred to as "high-temperature count value Y"), a first determination value DET1 and a second determination value DET2 are predetermined. First determination value DET1 is a value with which to fix the determination that catalyst temperature Tc is a high temperature. Second determination value DET2 is a value with which to fix the determination that catalyst temperature Tc has decreased to a normal temperature (i.e., the catalyst has already been cooled).

In the example shown in FIG. 13, at time t20, vehicle 100 is performing the battery-less traveling. Catalyst temperature Tc at time t20 is a temperature between first threshold value TH1 and second threshold value TH2. High-temperature count value Y is 0. The high-temperature determination flag is OFF. The output suppression request is also OFF.

Continued output from engine 1 causes catalyst temperature Tc to rise to go above first threshold value TH1 at time t21. Then, high-temperature count value Y is incremented during the time period in which catalyst temperature Tc is above first threshold value TH1.

High-temperature count value Y continues to be incremented, until reaching first determination value DET1 at time t22. In this case, it is likely that battery pack 7 has reached a high temperature due to the radiant heat from exhaust pipe 21, and therefore the high-temperature determination flag is switched from OFF to ON. In response to this, an output suppression request is output from hybrid ECU 101 to engine ECU 102. In response to the output suppression request from hybrid ECU 101, engine ECU 102 decreases upper limit output Plim of engine 1.

Then, the output of engine 1 decreases, thereby causing catalyst temperature Tc to decrease, so that catalyst temperature Tc goes below second threshold value TH2 at time t23. Then, high-temperature count value Y is decremented during the time period in which catalyst temperature Tc is below second threshold value TH2.

When high-temperature count value Y reaches second determination value DET2 (DET2<DET1) at time t24, the high-temperature determination flag is switched from ON to OFF. In response to this, the output of the output suppression request from hybrid ECU 101 to engine ECU 102 is stopped (i.e., the output suppression control is canceled). After that, high-temperature count value Y is reset (time t25).

In the example shown in FIG. 13, the time period in which catalyst temperature Tc is above first threshold value TH1, i.e., the time period from time t21 to time t22, corresponds to the "first predetermined time" in the present disclosure. As described in embodiment 1, if catalyst temperature Tc is intermittently above first threshold value TH1, the integrated value of the time during which catalyst temperature Tc is above first threshold value TH1 may be defined as the "first predetermined time" in the present disclosure. The time period from time t23 to time t24 in which catalyst temperature Tc is below second threshold value TH2 corresponds to the "second predetermined time" in the present disclosure. The "second predetermined time" may also be the integrated value of the time during which catalyst temperature Tc is below second threshold value TH2.

<Flowchart of Engine Control>

FIG. 14 is a flowchart showing the flag control of engine 1 in embodiment 3. Although not shown because of space limitations, ECU 10 first determines whether or not vehicle 100 is performing the battery-less traveling. When vehicle 100 is not performing the battery-less traveling, ECU 10 returns the process to the main routine.

When vehicle 100 is performing the battery-less traveling, ECU 10 obtains catalyst temperature Tc from catalyst temperature sensor 22 (S501). Then, ECU 10 determines whether or not catalyst temperature Tc is equal to or more than first threshold value TH1 (S502). When catalyst temperature Tc is equal to or more than first threshold value TH1 (YES at S504), ECU 10 moves the process to S503.

At S503, ECU 100 determines whether or not vehicle speed V is equal to or less than upper limit speed UL. When vehicle speed V is equal to or less than upper limit speed UL (YES at S503), the cooling effect on battery pack 7 due to the traveling wind is comparatively small. Thus, ECU 10 moves the process to S504 and increments high-temperature count value Y (see time t21 in FIG. 13).

At S505, ECU 10 determines whether or not high-temperature count value Y is equal to or more than first determination value DET1. First determination value DET1 may be determined in the same manner as the first reference value.

When high-temperature count value Y is less than first determination value DET1 (NO at S505), ECU 10 returns the process to the main routine. Then, high-temperature count value Y continues to be incremented during the time period in which catalyst temperature Tc is equal to or more than first threshold value TH1. When high-temperature count value Y becomes equal to or more than first determination value DET1 (YES at S505), ECU 10 switches the high-temperature determination flag from OFF to ON (S506) (see time t22 in FIG. 13). In response to this, the output suppression control is executed.

When catalyst temperature Tc obtained at S502 is less than first threshold value TH1 (NO at S502), or when catalyst temperature Tc is equal to or more than first threshold value TH1 and vehicle speed V is more than upper limit speed UL (YES at S502 and NO at S503), then ECU 10 moves the process to S507 to determine whether or not the high-temperature determination flag is ON. When the high-temperature determination flag is OFF (NO at S507), ECU 10 maintains high-temperature count value Y (S508). Then, the process is returned to the main routine.

When the high-temperature determination flag is ON (YES at S507), ECU 10 determines whether or not catalyst temperature Tc is equal to or less than second threshold value TH2 (S509). When catalyst temperature Tc becomes equal to or less than second threshold value TH2 (YES at S509), ECU 10 decrements high-temperature count value Y (S510) (see time t23 in FIG. 13).

When catalyst temperature Tc is above second threshold value TH2 and vehicle speed V is more than upper limit speed UL (NO at S509 and YES at S513), ECU 10 decrements high-temperature count value Y by taking into consideration the cooling effect on battery pack 7 due to the traveling wind (S510).

On the other hand, during the time period in which catalyst temperature Tc is above second threshold value TH2 and vehicle speed V is equal to or less than upper limit speed UL while the output suppression control is being executed (NO at S509 and NO at S513), ECU 10 maintains high-temperature count value Y (S514). Then, ECU 10 returns the process to the main routine.

At S511, ECU 10 determines whether or not high-temperature count value Y is equal to or less than second determination value DET2. Second determination value DET2 can be set in the same manner as second reference value REF2.

When high-temperature count value Y is more than second determination value DET2 (NO at S511), ECU 10 returns the process to the main routine. Then, high-temperature count value Y continues to be decremented until reaching second determination value DET2 during the time period in which catalyst temperature Tc is equal to or more than second threshold value TH2 and in which vehicle speed V is equal to or less than upper limit speed UL. When high-temperature count value Y becomes equal to or less than second determination value DET2 (YES at S511), ECU 10 switches the high-temperature determination flag from ON to OFF (S512) (see time t24 in FIG. 13). In response to this, the output suppression control is stopped (i.e., the suppression of output is canceled). After that, ECU 10 resets high-temperature count value Y, although not shown in FIG. 14 (see time t25 in FIG. 13).

In this way, when vehicle speed V is more than upper limit speed UL, ECU 10 maintains high-temperature count value Y. That is, when vehicle speed V is more than upper limit speed UL, ECU 10 delays the start of execution of the output suppression control as compared to when vehicle speed V is less than upper limit speed UL. This can avoid a situation in which the execution of the output suppression control is unnecessarily started when battery pack 7 has already been cooled by the traveling wind.

When vehicle speed V is more than upper limit speed UL, ECU 10 decrements high-temperature count value Y even if catalyst temperature Tc is above second threshold value TH2. That is, when vehicle speed V is more than upper limit speed UL, ECU 10 accelerates the stop of the output suppression control as compared to when vehicle speed V is less than upper limit speed UL. This can avoid a situation in which the output suppression control is unnecessarily continued when battery pack 7 has already been cooled by the traveling wind.

In the example above, upper limit speed UL with which to determine whether to increment high-temperature count value Y ("first predetermined speed" in the present disclosure) is equal to upper limit speed UL with which to determine whether to decrement high-temperature count value Y ("second predetermined speed"). However, the "first predetermined speed" and the "second predetermined speed" in the present disclosure may be different from each other.

FIG. 14 describes that high-temperature count value Y is maintained when vehicle speed V is more than upper limit speed UL (see S508). However, high-temperature count value Y may be decremented when vehicle speed V is more than upper limit speed UL. By decrementing high-temperature count value Y when vehicle speed V is more than upper limit speed UL regardless of catalyst temperature Tc, the output suppression control can be stopped at an early stage, leading to early recovery of the traveling performance of vehicle 100. Note that, however, if importance is attached to the protection of battery pack 7, high-temperature count value Y is preferably maintained even when vehicle speed V is more than upper limit speed UL.

Figure 15:
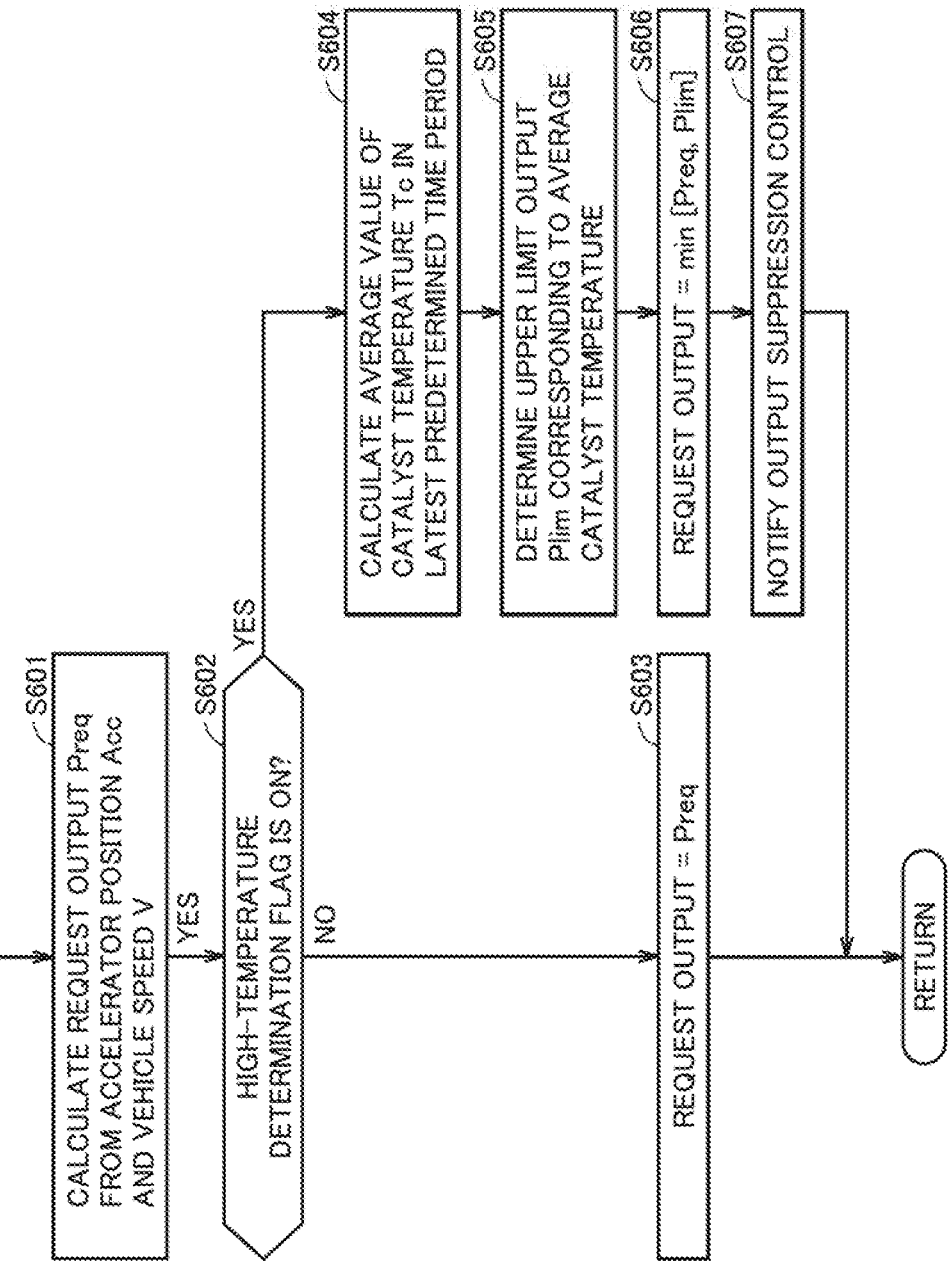
FIG. 15 is a flowchart showing the output control of engine in embodiment 3.

FIG. 15 is a flowchart showing the output control of engine 1 in embodiment 3. With reference to FIG. 15, at S601, ECU 10 calculates a provisional value of request output Preq for engine 1 based on accelerator position Acc and vehicle speed V.

At S602, ECU 10 determines whether or not the high-temperature determination flag is ON. When the high-temperature determination flag is OFF (NO at S602), ECU 10 fixes request output Preq as a request output for engine 1 (S603).

When the high-temperature determination flag is ON (YES at S602), ECU 10 reads catalyst temperature Tc stored in the memory and calculates the average value of catalyst temperature Tc in the latest predetermined time period (S604).

At S605, ECU 10 determines upper limit output Plim corresponding to the average value of catalyst temperature Tc by referring to map MP1 or map MP2 (see, for example, FIG. 3 or 4).

At S606, ECU 10 compares request output Preq with upper limit output Plim, and determines a lower one of request output Preq and upper limit output Plim to be the definite value of request output Preq for engine 1.

At S607, ECU 10 controls HMI 8 to notify that the output suppression control is being executed. The user receiving the notification can recognize that the output of engine 1 is being suppressed. This can reduce the user's sense of discomfort that would be caused by the decrease in limp-home traveling performance.

As above, in embodiment 3, only one counter is used instead of two counters. With the two counters being combined, the same effects as those of embodiment 1 can be achieved. That is, when catalyst temperature Tc is above first threshold value TH1 during the battery-less traveling of vehicle 100, the output of engine 1 is decreased, thereby reducing the radiant heat from exhaust pipe 21 and suppressing a temperature rise of battery pack 7. Therefore, embodiment 3 can protect battery pack 7 while allowing vehicle 100 to continue the battery-less traveling.

Also, in embodiment 3, when vehicle speed V is equal to or less than upper limit speed UL, high-temperature count value Y is incremented (S505) or decremented (S511). Thus, the condition of vehicle speed V can be added to the condition for determining whether to increment or decrement high-temperature count value Y, taking into consideration the cooling effect of the traveling wind on battery pack 7. This can prevent the output suppression control from being executed when battery pack 7 has already been cooled. Thus, the degradation of the traveling performance of vehicle 100 can be prevented that would be caused by unnecessary execution of the output suppression control.

In embodiment 3, the degree of suppression of engine 1 output may depend not only on catalyst temperature Tc but also on vehicle speed V, as in variation 1 of embodiment 1. Although FIG. 15 describes an example in which the output suppression control is performed by decreasing upper limit output Plim of engine 1, the output suppression control may also be implemented by changing request output Preq for engine 1 as described in variation 2 of embodiment 1.

FIGS. 13 to 15 describe an example of the output suppression control based on catalyst temperature Tc. However, in embodiment 3 (i.e., with only one counter), the output suppression control may be executed based on the temperature of battery pack 7 as described in embodiment 2.

While embodiments of the present disclosure have been described, it should be understood that the embodiments disclosed herein are by way of example in every respect, not by way of limitation. The scope of the present disclosure is defined by the terms of the appended claims, and is intended to include any modification within the meaning and scope equivalent to the terms of the claims.

What is claimed is:

1. A hybrid vehicle comprising:
an engine;
an exhaust pathway through which exhaust gas from the engine is released;
a battery pack located near the exhaust pathway; and
a controller that executes, during limp-home traveling of the hybrid vehicle, control in which the battery pack is not charged and discharged, and output suppression control in which output of the engine is suppressed, wherein
in the output suppression control, when an estimated temperature of the battery pack is above a threshold value, the controller suppresses the output of the engine as compared to when the estimated temperature is below the threshold value, while maintaining a state in which the engine can output power.

2. The hybrid vehicle according to claim 1, further comprising:
a drive device that drives a traction motor of the hybrid vehicle; and
a relay electrically connected between the battery pack and the drive device, wherein
during the limp-home traveling, the controller opens the relay so that the battery pack is electrically disconnected from the drive device.

3. The hybrid vehicle according to claim 1, wherein
the exhaust pathway includes a catalyst for purifying the exhaust gas,
the hybrid vehicle further comprises a sensor that outputs a temperature of the catalyst, and
the controller uses the temperature of the catalyst as the estimated temperature.

4. The hybrid vehicle according to claim 1, wherein
the exhaust pathway includes a catalyst for purifying the exhaust gas,
the hybrid vehicle further comprises a sensor that outputs an operational status of the engine, and
the controller estimates a temperature of the catalyst based on the output from the sensor, and uses the temperature of the catalyst as the estimated temperature.

5. The hybrid vehicle according to claim 1, wherein
the battery pack includes
an assembled battery,
a cooling device that cools the assembled battery, and
equipment that is not cooled by the cooling device, and
the hybrid vehicle further comprises a sensor that outputs a temperature of the assembled battery as the estimated temperature.

6. The hybrid vehicle according to claim 1, wherein
the controller executes the output suppression control when a state in which the estimated temperature is above the threshold value lasts longer than a first predetermined time.

7. The hybrid vehicle according to claim 1, wherein
when a speed of the hybrid vehicle is more than a first predetermined speed, the controller delays a start of execution of the output suppression control as compared to when the speed of the hybrid vehicle is less than the first predetermined speed.

8. The hybrid vehicle according to claim 1, wherein
when the estimated temperature goes below another threshold value less than the threshold value after a start of execution of output suppression of the engine, the controller stops the output suppression control.

9. The hybrid vehicle according to claim 8, wherein
when a state in which the estimated temperature is below the another threshold value lasts longer than a second predetermined time after the start of execution of output suppression of the engine, the controller stops the output suppression control.

10. The hybrid vehicle according to claim 1, wherein
when a speed of the hybrid vehicle is more than a second predetermined speed, the controller accelerates a stop of the output suppression control as compared to when the speed of the hybrid vehicle is less than the second predetermined speed.

11. The hybrid vehicle according to claim 1, wherein
the controller increases a degree of suppression of the output of the engine with an increase in the estimated temperature.

12. The hybrid vehicle according to claim 11, wherein
the controller decreases the degree of suppression of the output of the engine with an increase in vehicle speed of the hybrid vehicle.

13. The hybrid vehicle according to claim 1, further comprising a notifying device that notifies a user of the hybrid vehicle that the output suppression control is being executed.

14. The hybrid vehicle according to claim 1, wherein in the output suppression control, when the estimated temperature is above the threshold value, the controller reduces an upper limit output of the engine as compared to when the estimated temperature is below the threshold value.

15. The hybrid vehicle according to claim 1, wherein in the output suppression control, when the estimated temperature is above the threshold value, the controller reduces a request output for a given accelerator position as compared to when the estimated temperature is below the threshold value.

16. A hybrid vehicle comprising:
an engine;
an exhaust pathway which includes a catalyst for purifying exhaust gas from the engine and through which the purified exhaust gas is released;
a battery pack located near the exhaust pathway; and
a controller that executes, during limp-home traveling of the hybrid vehicle, control in which the battery pack is not charged and discharged, and output suppression control in which output of the engine is suppressed, wherein in the output suppression control, when a state in which a temperature of the catalyst is above a threshold value lasts longer than a predetermined time, the controller suppresses the output of the engine as compared to when the temperature of the catalyst is below the threshold value, while maintaining a state in which the engine can output power.

17. A control method for a hybrid vehicle,
the hybrid vehicle comprising:
an engine;
an exhaust pathway through which exhaust gas from the engine is released; and
a battery pack located near the exhaust pathway,
the control method comprising:
detecting an estimated temperature of the battery pack; and
during limp-home traveling of the hybrid vehicle, controlling the battery pack not to be charged and discharged, and when the estimated temperature is above a threshold value, suppressing output of the engine as compared to when the estimated temperature is below the threshold value, while maintaining a state in which the engine can output power.

* * * * *